United States Patent
Fujita et al.

(10) Patent No.: US 7,811,703 B2
(45) Date of Patent: Oct. 12, 2010

(54) NONAQUEOUS ELECTROLYTE BATTERY, BATTERY PACK AND VEHICLE

(75) Inventors: Yumi Fujita, Yokohama (JP); Hiroki Inagaki, Kawasaki (JP); Hidesato Saruwatari, Saku (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 876 days.

(21) Appl. No.: 11/687,860

(22) Filed: Mar. 19, 2007

(65) Prior Publication Data

US 2007/0231690 A1   Oct. 4, 2007

(30) Foreign Application Priority Data

Mar. 30, 2006   (JP) .............................. 2006-095174

(51) Int. Cl.
*H01M 4/02* (2006.01)
*H01M 4/58* (2006.01)
(52) U.S. Cl. .................. 429/209; 429/231.1; 429/231.5
(58) Field of Classification Search ................ 429/209, 429/231.1–231.5
See application file for complete search history.

(56) References Cited

U.S. PATENT DOCUMENTS

| | | | |
|---|---|---|---|
| 2005/0064282 A1 | 3/2005 | Inagaki et al. | |
| 2005/0069777 A1 | 3/2005 | Takami et al. | |
| 2005/0221173 A1 | 10/2005 | Tatebayashi et al. | |
| 2005/0221187 A1 | 10/2005 | Inagaki et al. | |
| 2005/0221188 A1* | 10/2005 | Takami et al. | 429/231.95 |
| 2006/0046155 A1 | 3/2006 | Inagaki et al. | |
| 2006/0068272 A1 | 3/2006 | Takami et al. | |
| 2006/0134520 A1 | 6/2006 | Ishii et al. | |
| 2006/0216600 A1 | 9/2006 | Inagaki et al. | |
| 2006/0257746 A1 | 11/2006 | Inagaki et al. | |
| 2007/0009794 A1 | 1/2007 | Takami et al. | |
| 2007/0009797 A1 | 1/2007 | Takami et al. | |
| 2007/0009798 A1 | 1/2007 | Inagaki et al. | |
| 2007/0009801 A1 | 1/2007 | Inagaki et al. | |
| 2007/0059592 A1 | 3/2007 | Takami et al. | |
| 2007/0059602 A1 | 3/2007 | Morishima et al. | |
| 2008/0070115 A1 | 3/2008 | Saruwatari et al. | |

FOREIGN PATENT DOCUMENTS

| | | | |
|---|---|---|---|
| JP | 2005-72008 | | 3/2005 |
| JP | 2005158721 A | * | 6/2005 |

OTHER PUBLICATIONS

U.S. Appl. No. 11/387,776, filed Mar. 24, 2006, Hiroki.

(Continued)

*Primary Examiner*—Patrick Ryan
*Assistant Examiner*—Karie O'Neill Apicella
(74) *Attorney, Agent, or Firm*—Oblon, Spivak, McClelland, Maier & Neustadt, L.L.P.

(57) ABSTRACT

A nonaqueous electrolyte battery includes a positive electrode, a negative electrode and a nonaqueous electrolyte. The negative electrode contains a negative electrode active material. The negative electrode active material has a lithium ion insertion potential of 0.4V (vs. Li/Li$^+$) or higher and a pore diameter distribution in which a median diameter is not smaller than 1 μm and a mode diameter is not larger than 1/10 of the median diameter. The pore diameter distribution is measured by mercury porosimetry.

17 Claims, 10 Drawing Sheets

OTHER PUBLICATIONS

U.S. Appl. No. 11/694,454, filed Mar. 30, 2007, Inagaki, et al.
U.S. Appl. No. 11/687,844, filed Mar. 19, 2007, Fujita, et al.
U.S. Appl. No. 12/047,857, filed Mar. 13, 2008, Ishii, et al.
U.S. Appl. No. 12/047,708, filed Mar. 13, 2008, Saruwatari, et al.
U.S. Appl. No. 11/756,259, filed May 31, 2007, Saruwatari, et al.
U.S. Appl. No. 12/512,540, filed Jul. 30, 2009, Inagaki, et al.
U.S. Appl. No. 11/853,546, filed Sep. 11, 2007, Harada, et al.
U.S. Appl. No. 11/855,587, filed Sep. 14, 2007, Inagaki, et al.
U.S. Appl. No. 11/940,688, filed Nov. 15, 2007, Inagaki, et al.

* cited by examiner

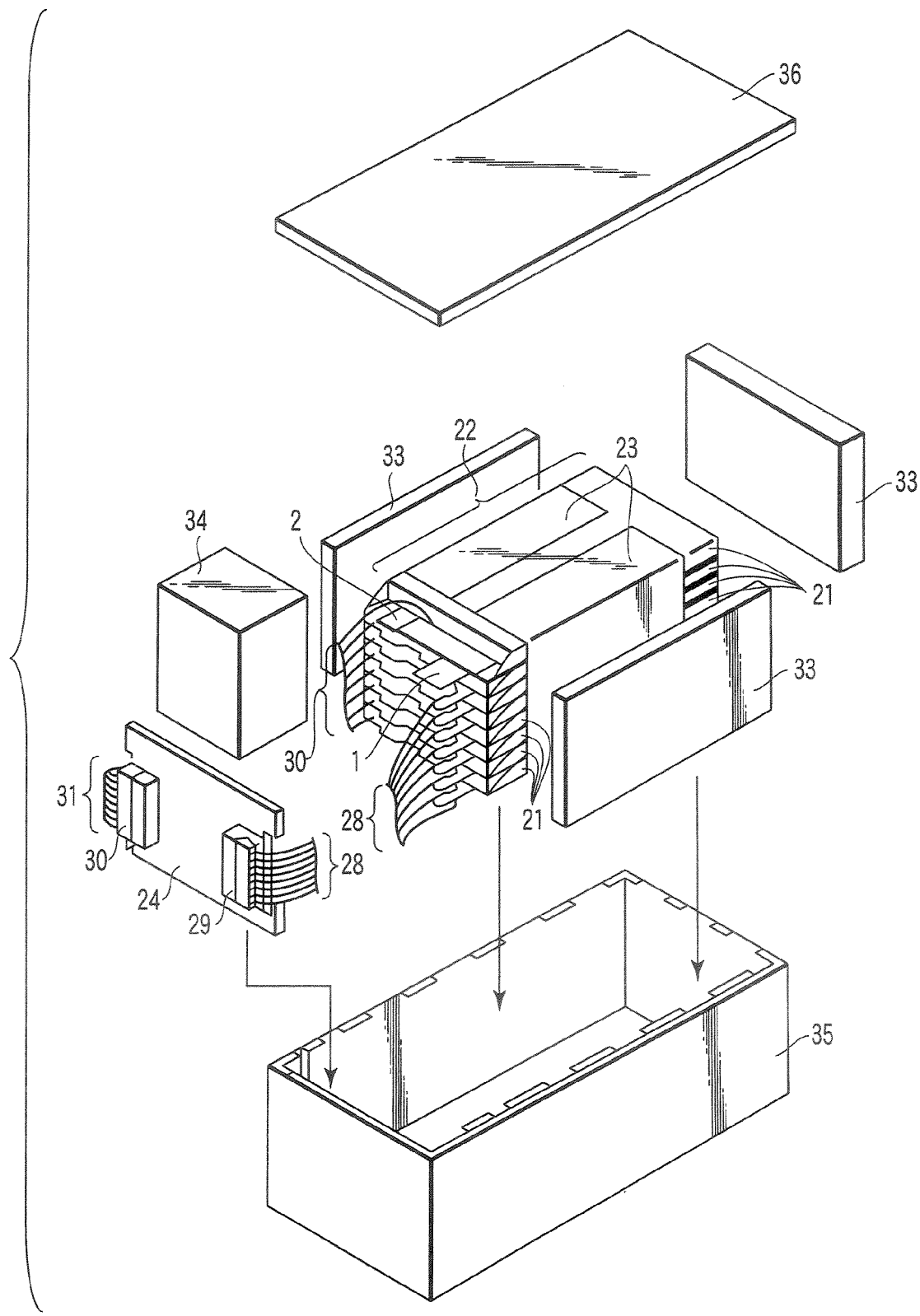
F I G. 5

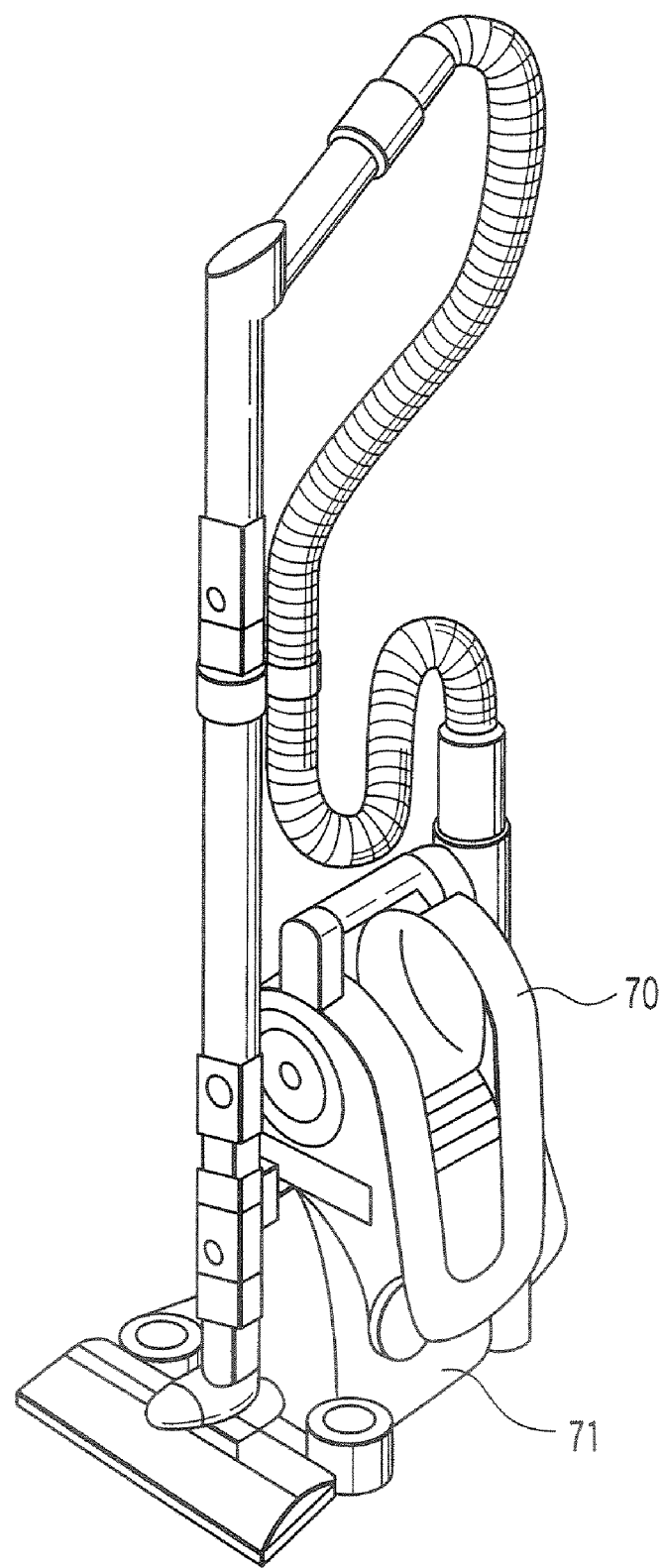
F I G. 13

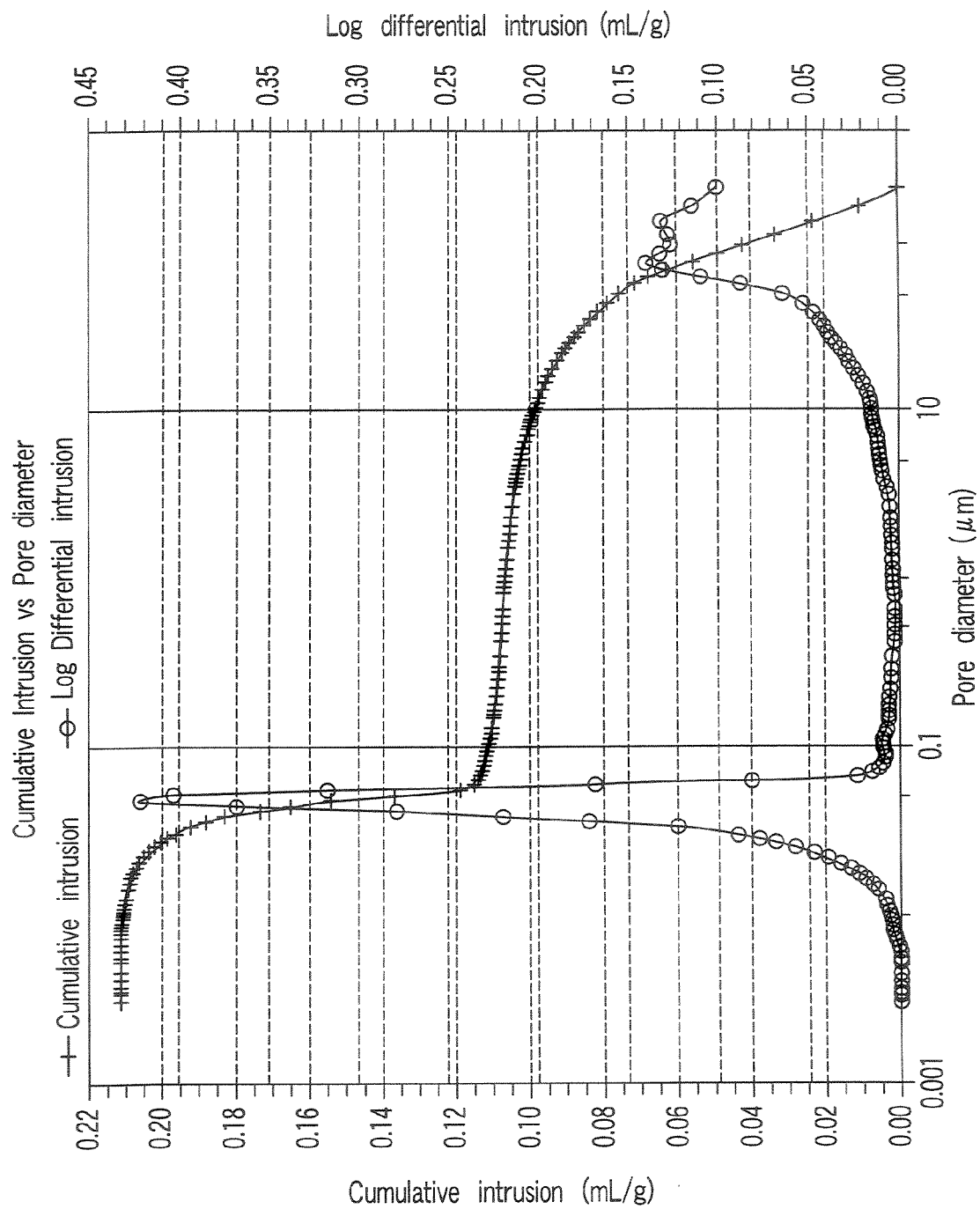
F I G. 14

12.0 μm 15.0 μm

US 7,811,703 B2

NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2006-095174, filed Mar. 30, 2006, the entire contents of which are incorporated herein by reference.

BACKGROUND OF THE INVENTION

1. Field of the Invention

The present invention relates to a nonaqueous electrolyte battery, a battery pack equipped with a nonaqueous electrolyte battery, and a vehicle having a battery pack mounted thereto.

2. Description of the Related Art

Along with miniaturization of, for example, personal computers, video cameras and portable telephones, nonaqueous electrolyte batteries have been put to practical use and widely spread in the fields of information relevant devices and communication devices as the power sources because they have high energy density. Meanwhile, in the field of vehicles, it is desired to develop electric motor vehicles as quickly as possible because of environmental and resource problems and studies are being made also as to nonaqueous electrolyte batteries as the power sources of these electric motor vehicles.

It is demanded of these secondary batteries used for the power source of these electric motor vehicles to have a high energy density and, specifically, to have a high discharge capacity per unit weight or unit volume. Then, even in the case where large current is input in a moment to recover the kinetic energy in the decelerating stage as the electric power, it is demanded of these secondary batteries to have the ability of charging efficiently. In short, the secondary batteries used as the power sources of electric motor vehicles are desired not only to have a large capacity but also to have good performance of inputting power in a short time. Also, the secondary batteries are required to exhibit a large output, i.e., to be capable of an instant discharge of a large current when, for example, the vehicles start, abruptly move or abruptly accelerate.

It is disclosed in JP-A 2005-72008 (KOKAI) that a negative electrode active material formed of vanadium oxide, represented by $Li_xM_yV_zO_{2+d}$, has a pore volume per unit weight of $10^{-3}$ to 0.8 cc/g, the pores having a diameter of 0.1 to 10 μm.

BRIEF SUMMARY OF THE INVENTION

According to a first aspect of the present invention, there is provided a nonaqueous electrolyte battery comprising:

a positive electrode;

a negative electrode containing a negative electrode active material which has a lithium ion insertion potential of 0.4V (vs. Li/Li$^+$) or higher and a pore diameter distribution in which a median diameter is not smaller than 1 μm and a mode diameter is not larger than 1/10 of the median diameter, and the pore diameter distribution being measured by mercury porosimetry; and a nonaqueous electrolyte.

According to a second aspect of the present invention, there is provided a battery pack comprising a nonaqueous electrolyte battery, wherein the nonaqueous electrolyte battery comprises:

a positive electrode;

a negative electrode containing a negative electrode active material which has a lithium ion insertion potential of 0.4V (vs. Li/Li$^+$) or higher and a pore diameter distribution in which a median diameter is not smaller than 1 μm and a mode diameter is not larger than 1/10 of the median diameter, and the pore diameter distribution being measured by mercury porosimetry; and a nonaqueous electrolyte.

According to a third aspect of the present invention, there is provided a vehicle comprising the nonaqueous electrolyte battery, wherein the nonaqueous electrolyte battery comprises:

a positive electrode;

a negative electrode containing a negative electrode active material which has a lithium ion insertion potential of 0.4V (vs. Li/Li$^+$) or higher and a pore diameter distribution in which a median diameter is not smaller than 1 μm and a mode diameter is not larger than 1/10 of the median diameter, and the pore diameter distribution being measured by mercury porosimetry; and a nonaqueous electrolyte.

BRIEF DESCRIPTION OF THE SEVERAL VIEWS OF THE DRAWING

FIG. 5 is an exploded perspective view of a battery pack according to a second embodiment;

FIG. 13 is a typical view showing a chargeable vacuum cleaner according to the third embodiment;

FIG. 14 is a graph showing the pore diameter distribution measured by mercury porosimetry in respect of the negative electrode of the nonaqueous electrolyte battery for Example 1;

DETAILED DESCRIPTION OF THE INVENTION

Figure 1A:
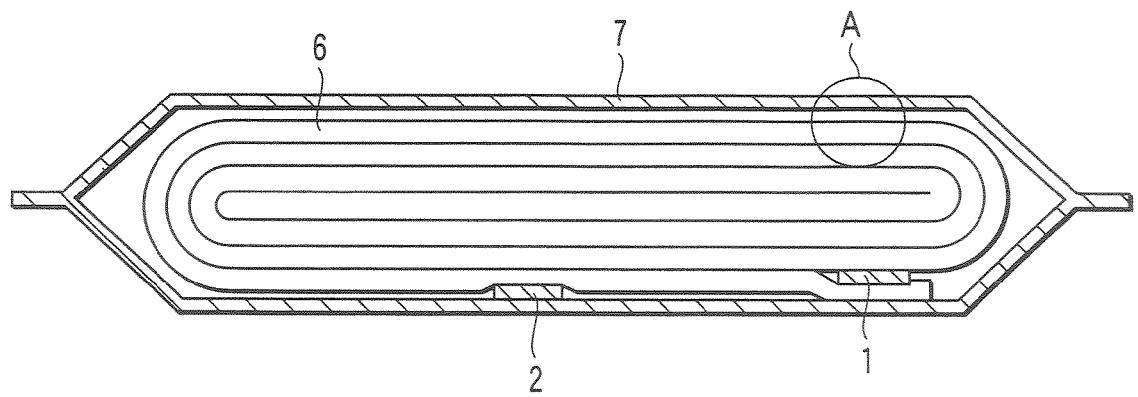
FIG. 1A is a typical sectional view of a flat type nonaqueous electrolyte battery according to a first embodiment.

As a result of an extensive research and various experiments, the present inventors have found that, in a negative electrode that inserts-releases lithium at a lithium ion insertion potential of 0.4V (vs. Li/Li$^+$) or higher, i.e., at a potential nobler than the lithium metal potential by 0.4V or more, the negative electrode of the same porosity exhibits an improved capability of retaining the nonaqueous electrolyte with increase in the pore size within the negative electrode so as to lower the internal impedance of the battery. To be more specific, it has been clarified that, by having a pore diameter distribution in which the median diameter is 1 μm or more and the mode diameter is at a level not higher than $1/10$ of the median diameter, the impregnation capability of the nonaqueous electrolyte can be markedly improved without lowering the density of the negative electrode, so as to improve not only the productivity but also the input-output performance under a large current and the charge-discharge cycle life. Incidentally, the pore diameter distribution is measured by mercury porosimetry. As indicated in the Examples described herein later, it has been confirmed that 3 to 10 pores each having a cross-sectional area of 2 to 10 μm$^2$ are present per 100 μm$^2$ of a cross-section obtained by cutting the negative electrode in a direction perpendicular to the current collector.

Further, a battery having a high battery voltage can be obtained by using a lithium-manganese-nickel composite oxide having a spinel structure as the positive electrode active material in combination with the negative electrode. Alternatively, it is possible to obtain a nonaqueous electrolyte battery excellent in the thermal stability by using a lithium-phosphorus composite oxide having an olivine structure, (e.g., Li$_x$FePO$_4$, Li$_x$Fe$_{1-x}$Mn$_y$PO$_4$, Li$_x$VPO$_4$F, or Li$_x$CoPO$_4$, where $0 \leq x \leq 1$, $0 \leq y \leq 1$), as the positive electrode active material.

Each embodiment will now be described with reference to the accompanying drawings. Incidentally, the common constituents of the embodiments are denoted by the same reference numerals so as to avoid an overlapping description. Also, the accompanying drawings are intended to show schematically the construction of the present invention for facilitating the understanding of the present invention and, thus, it is possible for the shape, size, ratio, etc. shown in the drawings to differ from those of the actual apparatus, such as the battery. Naturally, it is possible to change appropriately the design of the apparatus in view of the description given below and in view of the known technology.

First Embodiment

Figure 1B:
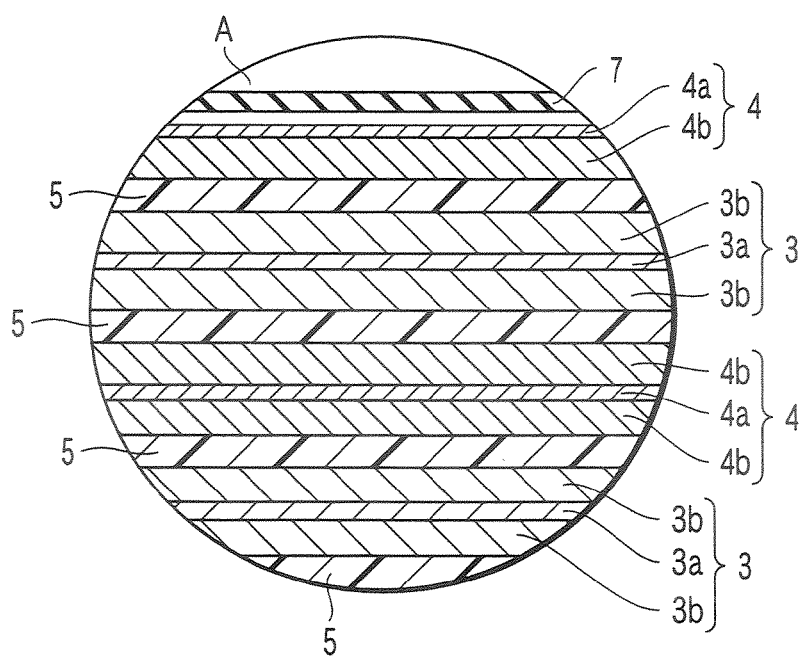
FIG. 1B is a typical view showing a partial section of the part enclosed by the circle shown by A in FIG. 1A in detail.

The construction of a nonaqueous electrolyte battery according to a first embodiment will now be exemplified with reference to FIGS. 1A and 1B. FIG. 1A is a cross-sectional view exemplifying the construction of a lithium ion secondary battery, which is one of the nonaqueous electrolyte batteries according to the first embodiment, and FIG. 1B is a cross-sectional view showing, in a magnified fashion, the construction of part A of the secondary battery shown in FIG. 1A.

As shown in FIG. 1A, an electrode group 6 is housed in a case 7 formed of, for example, a film. The electrode group 6 comprises a positive electrode 3, and a negative electrode 4, which are laminated one upon the other with a separator 5 interposed therebetween. The laminate structure is spirally wound so as to obtain the electrode group 6 of a flattened structure. As shown in FIG. 1B, the positive electrode 3 comprises a positive electrode current collector 3a and a layer 3b containing a positive electrode active material. The layer 3b is formed on at least one surface of the positive electrode current collector 3a. Also, the negative electrode 4 comprises a negative electrode current collector 4a and a layer 4b containing a negative electrode active material. The layer 4b is formed on at least one surface of the negative electrode current collector 4a. Further, the separator 5 is interposed between the layer 3b containing the positive electrode active material and the layer 4b containing the negative electrode active material. Each of the layer 3b containing the positive electrode active material, the layer 4b containing the negative electrode active material and the separator 5 is porous.

A band-like positive electrode terminal 1 is connected to the positive electrode current collector 3a of the electrode group 6, and one edge portion of the positive electrode terminal 1 is drawn to the outside of the case 7. On the other hand, a band-like negative electrode terminal 2 is connected to the negative electrode current collector 4a of the electrode group 6, and one edge portion of the negative electrode terminal 2 is drawn to the outside of the case 7. The positive electrode terminal 1 and the negative electrode terminal 2 are drawn from the same side of the case 7, and the drawing direction of the positive electrode terminal 1 is equal to the drawing direction of the negative electrode terminal 2.

It is possible for the negative electrode current collector 4a to be positioned in the outermost layer of the electrode group 6 such that at least a part of the surface of the outermost layer is covered with the bonded portion. As a result, the electrode group 6 can be bonded to the case 7.

Each of the positive electrode, the negative electrode, the separator, the nonaqueous electrolyte and the case will now be described in detail.

1) Negative Electrode:

The negative electrode comprises a negative electrode current collector and a layer containing the negative electrode active material, i.e., a negative electrode active material layer which is formed on at least one surface of the negative electrode current collector and contains a negative electrode active material having a lithium ion insertion potential of 0.4V (vs. Li/Li$^+$) or higher.

It is desirable for the negative electrode current collector to be formed of an aluminum foil or an aluminum alloy foil. It is also desirable for the negative electrode current collector to have an average crystal grain size not larger than 50 μm. In this case, it is possible to increase drastically the mechanical strength of the current collector so as to make it possible to press the negative electrode under a high pressure so as to increase the density of the negative electrode and, thus, the battery capacity can be increased. It is also possible to prevent the deterioration of the negative electrode current collector by dissolution and corrosion during the over-discharge cycle under a high temperature environment (not lower than 40° C.), with the result that it is possible to suppress the elevation of the negative electrode impedance. Further, it is also possible to improve the output performance, the rapid charging performance and the charge-discharge cycle performance of the secondary battery. It is more desirable for the negative electrode current collector to have an average crystal grain size not larger than 30 μm, furthermore preferably not larger than 5 μm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1\times10^6/n$ ($\mu m^2$)", where n denotes the number of crystal grains noted above. Further, the average crystal grain size d ($\mu m$) is calculated from the area S by formula (1) given below:

$$d=2(S/\pi)^{1/2} \quad (1)$$

The aluminum foil or the aluminum alloy foil having the average crystal grain size not larger than 50 $\mu m$ can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 $\mu m$, more desirably not larger than 15 $\mu m$. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

The lithium ion insertion potential of the negative electrode active material is defined to be 0.4V (vs. Li/Li$^+$) or higher, as described previously. A difficulty is brought about in the case where the negative electrode active material is formed of an active material that inserts lithium ions at a potential baser than 0.4V (vs. Li/Li$^+$), e.g., a vanadium oxide represented by Li$_x$M$_y$V$_z$O$_{2+d}$, which is disclosed in JP-A 2005-72008 (KO-KAI) referred to previously. Specifically, if the particle diameter of the negative electrode active material exemplified above is diminished, the reducing reaction of the nonaqueous electrolyte proceeds excessively on the surface of the active material so as to markedly lower the battery performance, particularly, the output performance and the charge-discharge cycle life, of the secondary battery. This problem is brought about prominently in the case where the negative electrode active material that inserts lithium ions at a potential baser than 0.2V (vs. Li/Li$^+$) has a particle diameter not larger than 1 $\mu m$. Such being the situation, it is desirable for the lithium ion insertion potential of the negative electrode active material to be not lower than 0.4V (vs. Li/Li$^+$). On the other hand, it is desirable for the upper limit of the lithium ion insertion potential of the negative electrode active material to be 3V (vs. Li/Li$^+$), more desirably 2V (vs. Li/Li$^+$).

The negative electrode active material capable of inserting lithium ions in the range of 0.4 to 3V (vs. Li/Li$^+$) is preferably metal oxides, metal sulfides, metal nitrides or alloys.

Examples of such metal oxides include titanium-containing metal composite oxides, for example, tin type oxides such as SnB$_{0.4}$P$_{0.6}$O$_{3.1}$ and SnSiO$_3$, silicon type oxides such as SiO and tungsten type oxides such as WO$_3$. Among these materials, titanium-containing metal composite oxides are preferable.

Examples of the titanium-containing metal composite oxide may include titanium-based oxides containing no lithium when each oxide is synthesized, lithium-titanium oxide and lithium-titanium composite oxides obtained by substituting a part of the structural elements of lithium-titanium oxides with foreign elements. Examples of the lithium-titanium oxide may include lithium titanate having a spinel structure (for example, Li$_{4+x}$Ti$_5$O$_{12}$ (x is a value which is varied by charging or discharging, $0 \leq x \leq 3$)) and lithium titanate having a ramsdellite structure (for example, Li$_{2+y}$Ti$_3$O$_7$ (y is a value which is varied by charging or discharging, $0 \leq y \leq 3$)).

The titanium-based oxide noted above includes, for example, TiO$_2$ and a metal composite oxide containing Ti and at least one element selected from the group consisting of P, V, Sn, Cu, Ni, Co and Fe. It is desirable for TiO$_2$ to be of anatase type and to have a low crystallinity caused by a heat treating temperature of 300 to 500° C. The metal composite oxide containing Ti and at least one element selected from the group consisting of P, V, Sn, Cu, Ni, Co and Fe includes, for example, TiO$_2$—P$_2$O$_5$, TiO$_2$—V$_2$O$_5$, TiO$_2$—P$_2$O$_5$—SnO$_2$, and TiO$_2$—P$_2$O$_5$-MeO (Me denoting at least one element selected from the group consisting of Cu, Ni, Co and Fe). To be more specific, it is desirable for the micro structure of the metal composite oxide to include a crystal phase and an amorphous phase or a single phase formed of an amorphous phase. The particular micro structure makes it possible to improve markedly the charge-discharge cycle performance of the nonaqueous electrolyte battery. Particularly, it is desirable to use lithium-titanium oxide and a metal composite oxide containing Ti and at least one element selected from the group consisting of P, V, Sn, Cu, Ni, Co and Fe. It is more preferable to use the lithium-titanium oxide having a spinel structure.

The metal sulfides include, for example, titanium-based sulfide (for example, TiS$_2$), molybdenum-based sulfide (for example, MoS$_2$), and iron-based sulfides (for example, FeS, FeS$_2$, Li$_x$FeS$_2$ ($0 \leq x \leq 4$)).

Examples of metal nitrides include lithium-based nitrides (for example, (Li, Me)$_3$N {where Me represents a transition metal element}).

It is desirable for the negative electrode active material to have an average particle diameter not larger than 0.7 $\mu m$. In the case of using a negative electrode active material having an average particle diameter exceeding 0.7 $\mu m$, it may be difficult to provide a negative electrode with a pore diameter distribution falling within the range specified in the first embodiment. It should be noted, however, that, if the average particle diameter of the negative electrode active material is excessively small, the distribution of the nonaqueous electrolyte is inclined toward the negative electrode so as to cause the electrolyte to be depleted on the positive electrode. Such being the situation, it is desirable for the lower limit of the average particle diameter of the negative electrode active material to be set at 0.001 $\mu m$.

It is desirable for the negative electrode active material to have an average particle diameter not larger than 0.7 $\mu m$ and to have a specific surface area falling within a range of 5 to 50 m$^2$/g as determined by the BET method utilizing the N$_2$ adsorption. Where these conditions are satisfied, the negative electrode can be controlled easily to permit the pore diameter distribution to fall within range specified in the first embodiment, with the result that the negative electrode can be impregnated easily with the nonaqueous electrolyte.

The mode diameter and the median diameter of the negative electrode is obtained by the pore diameter distribution measured by mercury porosimetry. To be more specific, the peak top of the pore diameter distribution curve, in which the pore diameter is plotted on the abscissa and the frequency is plotted on the ordinate, is obtained as the mode diameter. On the other hand, the pore diameter at the cumulative volume frequency of 50% in the pore diameter distribution curve noted above is obtained as the median diameter. Incidentally, the term "pore" may denotes a small hole present inside a porous material and extending to reach the surface of the porous material (see Iwanami Rikagaku Jiten (Scientific Dictionary) version 5).

The median diameter in the pore diameter distribution of the negative electrode measured by mercury porosimetry is set at 1 $\mu m$ or more. Also, the mode diameter is defined to be not larger than 1/10 (or 0.1) of the median diameter. As a result, it is possible to form large pores inside the negative electrode while maintaining a high negative electrode density. For example, it is possible to observe 3 to 10 pores each having a cross-sectional area of 2 to 10 μm$^2$ per 100 μm$^2$ in a cross section obtained by cutting the negative electrode in a direction perpendicular to the current collector. As a result, the impregnation of the negative electrode with a nonaqueous electrolyte, which is performed by the capillary action, is promoted. At the same time, the negative electrode is enabled to exhibit an improved capability of holding the nonaqueous electrolyte.

It is desirable for the upper limit of the median diameter to be set at 3 μm. If the median diameter exceeds 3 μm, the mechanical strength of the negative electrode tends to be lowered. It should be noted that, where the median diameter falls within a range of 1 to 3 μm, the impregnation capability of the negative electrode with the nonaqueous electrolyte can be improved. In addition, it is possible to obtain a negative electrode with sufficient mechanical strength.

It is desirable for the lower limit of the mode diameter to be set at 1/100 (or 0.01) of the median diameter. Where the mode diameter falls within a range of 1/100 (or 0.01) to 1/10 (or 0.1) of the median diameter, the negative electrode can be impregnated with the nonaqueous electrolyte sufficiently. In addition, the nonaqueous electrolyte can be retained sufficiently in the negative electrode. It is more desirable for the ratio of the mode diameter to the median diameter to fall within a range of 0.017 to 0.05.

It is desirable for the negative electrode to have a density not lower than 1.5 g/cc and not higher than 2.6 g/cc. If the density of the negative electrode fails to fall within the range given above, it is difficult to obtain a negative electrode having the pore diameter distribution described above. It is more desirable for the negative electrode to have a density falling within a range of 2 to 2.5 g/cc.

It is possible for the negative electrode active material layer to contain an electrically conductive agent. The electrically conductive agent includes, for example, a carbon material, a metal powder such as an aluminum powder, and an electrically conductive ceramic material such as TiO. The carbon material noted above includes, for example, an acetylene black, a carbon black, coke, a carbon fiber and graphite. It is more desirable for the electrically conductive agent to be selected from the group consisting of coke having a heat treating temperature of 800 to 2,000° C. and having an average particle diameter not larger than 10 μm, graphite, a TiO powder and a carbon fiber having an average fiber diameter not larger than 1 μm. It is desirable for the carbon material to have a BET specific surface area not smaller than 10 m$^2$/g as determined by N$_2$ adsorption.

In order to suppress the gas generation effectively, it is desirable for the carbon material to have an average particle diameter not smaller than 0.1 μm. Also, in order to form a good electrically conductive network, it is desirable for the carbon material to have an average particle diameter not larger than 10 μm, more desirably not larger than 3 μm. Similarly, in order to form a good electrically conductive network, it is desirable for the carbon material to have a specific surface area not smaller than 10 m$^2$/g. Also, in order to suppress the gas generation effectively, it is desirable for the carbon material to have a specific surface area not larger than 100 m$^2$/g.

Where a carbon material having an average particle diameter not larger than 3 μm is used as the electrically conductive agent, it is desirable for the carbon material to be mixed in an amount not smaller than 5 parts by weight and not larger than 15 parts by weight relative to 100 parts by weight of the negative electrode active material. Where the carbon material is used in an amount falling within the range given above, it is possible to easily obtain a negative electrode having the pore diameter distribution specified in the first embodiment.

It is also possible for the negative electrode active material layer to contain a binder. The binder includes, for example, polyvinylidene fluoride (PVdF) having an average molecular weight not smaller than $4 \times 10^5$ and not larger than $20 \times 10^5$. In the case of using PVdF having a molecular weight falling within the range given above, it is possible to increase the peeling strength between the negative electrode current collector and the negative electrode active material layer to reach or exceed 0.005 N/mm so as to improve the large current performance of the secondary battery. Incidentally, where the average molecular weight of PVdF exceeds $20 \times 10^5$, it is certainly possible to obtain a sufficiently high peeling strength. However, the viscosity of the coating liquid is rendered excessively high, so as to make it impossible to carry out the coating appropriately. It is more desirable for PVdF to have an average molecular weight not smaller than $5 \times 10^5$ and not larger than $10 \times 10^5$.

Concerning the mixing ratio of the negative electrode active material, the electrically conductive agent and the binder, it is desirable for the negative electrode active material to be mixed in an amount of 67 to 97.5% by weight, for the electrically conductive agent to be mixed in an amount of 2 to 28% by weight, and for the binder to be mixed in an amount of 0.5 to 5% by weight. Where the electrically conductive agent is mixed in an amount not smaller than 2% by weight, it is possible to obtain a high current collecting performance, with the result that it is possible to obtain excellent large current performance. On the other hand, in order to increase the battery capacity sufficiently, it is desirable for the mixing amount of the electrically conductive agent to be not larger than 28% by weight. Also, where the binder is mixed in an amount not smaller than 0.5% by weight, it is possible to obtain a peeling strength not lower than 0.005 N/mm. On the other hand, where the mixing amount of the binder is not larger than 5% by weight, it is possible to obtain a coating liquid having an appropriate viscosity so as to make it possible to carry out the coating operation satisfactorily.

The negative electrode can be manufactured by, for example, coating a negative electrode current collector with a slurry prepared by suspending a negative electrode active material, a negative electrode electrically conductive agent and a binder in a generally used solvent, followed by drying the coated slurry so as to obtain a layer containing the negative electrode active material and subsequently pressing the negative electrode current collector coated with the negative electrode active material layer. In manufacturing the negative electrode, the slurry noted above is prepared as follows. In the first step, a negative electrode active material, a negative electrode electrically conductive agent and a binder are added to a small amount of a solvent, and kneaded by using, for example, a planetary mixer under the state that the mixture has a high solid material ratio (i.e., a high ratio of the negative electrode active material, the negative electrode electrically conductive agent and the binder to the solvent) so as to apply a strong shearing force to the mixture, thereby dispersing the solid materials in the solvent uniformly. It should be noted that, if the solid material ratio noted above is not sufficiently high, the shearing force is decreased so as to make it difficult to pulverize sufficiently the agglomerated negative electrode active material. If follows, in such a case, that it is difficult to permit the solid materials to be dispersed uniformly in the solvent. Such being the situation, the importance of the step of preparing the slurry rises in inverse proportion to the particle diameter of the negative electrode active material. The slurry preparing step is particularly important in the case of handling particles having an average particle diameter not larger than 0.7 μm. The mixture containing the negative electrode active material, etc. is sufficiently kneaded under the state that the mixture has a high solid material ratio and, then, the solid material ratio in the mixture is gradually lowered by adding a solvent to the mixture so as to prepare a slurry having a viscosity adapted for the coating operation. It is desirable for the amount of the solid material to be not smaller than 51% and not larger than 56%, more desirably to be not smaller than 54% and not larger than 55.5%.

The slurry having the viscosity adjusted to be suitable for the coating operation is sufficiently mixed in a bead mill using ceramic balls as the mixing media. In this step, the edges of the particles of the negative electrode active material are scratched off so as to smooth the surfaces of the particles of the negative electrode active material. As a result, the negative electrode active material can be loaded in a high density. It follows that it is possible to form pores having large diameters in the inner region of the negative electrode while forming a majority of pores having small diameters, thereby providing a negative electrode having the pore diameter distribution specified in the first embodiment. In this case, the ceramic balls can be formed of various materials, such as glass, alumina, mullite and silicon nitride, and it is desirable to use balls made of zirconia as the mixing media in view of the wear resistance and the impact resistance. It is desirable for the ceramic balls to have a diameter of 0.5 to 5 mm. If the diameter of the ceramic balls is smaller than 0.5 mm, the impact force of the ball is insufficient. On the other hand, if the ceramic balls have a diameter exceeding 5 mm, the contact area among the ceramic balls is diminished, so as to lower the kneading capability. It is more desirable for the ceramic balls to have a diameter of 1 to 3 mm.

The negative electrode current collector is coated with the slurry obtained as described above, followed by drying the coated slurry and subsequently pressing the negative electrode current collector coated with the dried slurry by using, for example, a roll press, thereby finishing the manufacture of the negative electrode. In this case, it is desirable to set the rolling temperature at 40 to 180° C. If the rolling temperature is excessively low, the electrically conductive agent having a specific gravity smaller than that of the negative electrode active material is caused to float on the surface of the electrode in the pressing stage, resulting in failure to obtain a negative electrode having appropriate pores and a high density. It follows that the electrode fails to be impregnated sufficiently with an electrolytic solution. In addition, the battery performance is also lowered. On the other hand, if the rolling temperature is higher than 180° C., the crystallization of the binder proceeds so as to lower the flexibility of the electrode. Also, the negative electrode active material layer tends to be broken and tends to be peeled off. As a result, the productivity is lowered, and the battery performance, such as the output performance and the charge-discharge cycle performance of the secondary battery, is also lowered. It is more desirable for the roll temperature to fall within a range of 90 to 150° C.

2) Positive Electrode:

The positive electrode comprises a positive electrode current collector, and a layer containing a positive electrode active material (i.e., a positive electrode active material layer) and a binder. The positive electrode active material layer is formed on one surface or both surfaces of the positive electrode current collector.

It is desirable for the positive electrode current collector to be formed of an aluminum foil or an aluminum alloy foil. It is desirable for the aluminum foil or the aluminum alloy foil forming the positive electrode current collector to have an average crystal grain size not larger than 50 μm. It is more desirable for the average crystal grain size noted above to be not larger than 30 μm, and furthermore desirably not larger than 5 μm. Where the average crystal grain size of the aluminum foil or the aluminum alloy foil forming the positive electrode current collector is not larger than 50 μm, the mechanical strength of the aluminum foil or the aluminum alloy foil can be drastically increased to make it possible to press the positive electrode with a high pressure. It follows that the density of the positive electrode can be increased to increase the battery capacity.

The aluminum foil or the aluminum alloy foil having the average crystal grain size not larger than 50 μm can be affected in a complicated fashion by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 μm, preferably not larger than 15 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

Given as examples of the active materials of the above positive electrode are various oxides, sulfides and polymers. Examples of the active materials include manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $Li_xNi_{1-y}CO_yO_2$), lithium-manganese-cobalt composite oxide (for example, $Li_xMn_yCo_{1-y}O_2$), spinel type lithium-manganese-nickel composite oxide (for example, $Li_xMn_{2-y}Ni_yO_4$), lithium phosphates having an olivine structure (for example, $Li_xFePO_4$, $Li_xFe_{1-y}Mn_yPO_4$ and $Li_xCoPO_4$), iron sulfate ($Fe_2(SO_4)_3$) and vanadium oxide (for example, $V_2O_5$). Also, organic materials, for example, electroconductive polymers such as polyaniline and polypyrrole, and disulfide type polymers are exemplified. Inorganic materials, for example, sulfur (S) and carbon fluoride are exemplified.

Preferable examples of the positive electrode active materials for the secondary battery include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}CO_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$) and lithium iron phosphates ($Li_xFePO_4$). It is to be noted x and y are respectively preferably in the range of 0 to 1. These positive electrode active materials permit increasing the battery voltage.

Also, as the positive electrode active material, a lithium-nickel-cobalt-manganese composite oxide having a composition represented by the formula $Li_aNi_bCo_cMn_dO_2$ (where the molar ratios a, b, c, and d are given by the following equations: $0 \leq a \leq 1.1$, $0.1 \leq b \leq 0.5$, $0 \leq c \leq 0.9$, $0.1 \leq d \leq 0.5$) may be used.

An electrically conductive agent contained in the positive electrode includes, for example, an acetylene black, a carbon black, and graphite.

Further, the binder includes, for example, polytetrafluoro ethylene (PTFE), polyvinylidene fluoride (PVdF) and a fluorinated rubber.

Concerning the mixing ratio of the positive electrode active material, the electrically conductive agent and the binder, it is desirable for the positive electrode active material to be mixed in an amount of 80 to 95% by weight, for the electrically conductive agent to be mixed in an amount of 3 to 18% by weight, and for the binder to be mixed in an amount of 2 to 17% by weight.

3) Separator:

A porous separator is used. The porous separator is made of, for example, a porous film such as a polyethylene film, a polypropylene film, a cellulose film and a polyvinylidene fluoride (PVdF) film. Particularly, it is desirable to use a porous film containing polyethylene and/or polypropylene because the porous film exemplified above permits improving the safety of the secondary battery.

It is desirable for the separator to exhibit a porosity not lower than 50% measured by mercury porosimetry. In order to permit the separator to be impregnated easily with the electrolytic solution and to improve the input-output power density of the secondary battery, it is desirable for the separator to have a porosity not lower than 50%. On the other hand, in order to retain the safety of the secondary battery, it is desirable for the separator to have a porosity not higher than 70%.

4) Nonaqueous Electrolyte:

The nonaqueous electrolyte includes a liquid nonaqueous electrolyte prepared by dissolving an electrolyte in an organic solvent and a gel nonaqueous electrolyte prepared by using a composite material comprising a nonaqueous electrolytic solution and a polymer material.

It is possible to use a nonaqueous electrolyte containing an ionic liquid that is not volatile and that is nonflammable.

The liquid nonaqueous electrolyte can be prepared by dissolving an electrolyte in an organic solvent in a concentration not lower than 0.5 mol/L and not higher than 2.5 mol/L.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethylsulfonylimide lithium [$LiN(CF_3SO_2)_2$], and a mixture thereof. It is desirable to use an electrolyte that is unlikely to be oxidized under a high potential. Particularly, it is most desirable to use $LiPF_6$ as the electrolyte.

The organic solvent includes, for example, cyclic carbonates such as propylene carbonate (PC), ethylene carbonate (EC) and vinylene carbonate; linear carbonates such as diethyl carbonate (DEC), dimethyl carbonate (DMC) and methyl ethyl carbonate (MEC); cyclic ethers such as tetrahydrofuran (THF), 2-methyl tetrahydrofuran (2Me THF) and dioxolane (DOX); linear ethers such as dimethoxy ethane (DME), and diethoxy ethane (DEE); as well as γ-butyrolactone (GBL), acetonitrile (AN) and sulfolane (SL). These solvents can be used singly or in the form of a mixed solvent.

The polymer materials include, for example, polyvinylidene fluoride (PVdF), polyacrylonitrile (PAN) and polyethylene oxide (PEO).

It is desirable to use a mixed solvent prepared by mixing at least two organic solvents selected from the group consisting of propylene carbonate (PC), ethylene carbonate (EC) and γ-butyrolactone (GBL). It is more desirable to use the organic solvent containing γ-butyrolactone (GBL). The reasons why these organic compounds can be used as excellent solvents are as follows.

First of all, each of γ-butyrolactone, propylene carbonate and ethylene carbonate has a high boiling point and a high ignition point and is excellent in the thermal stability.

Secondly, the titanium-containing metal composite oxide such as the lithium-titanium oxide inserts and releases the lithium ions within the potential region in the vicinity of 1.5V (vs. $Li/Li^+$). However, it is impossible to form sufficiently a film made of the reduction product of the nonaqueous electrolyte on the surface of the lithium-titanium oxide particle within the potential region noted above, though it is certainly possible to allow the nonaqueous electrolyte to be reduced and decomposed within the potential region noted above. Therefore, if the battery is stored under the charged state, the lithium ions inserted in the lithium-titanium oxide is gradually diffused into the nonaqueous electrolyte to bring about a so-called "self-discharge". The self-discharge is generated prominently if the battery is stored under an environment of a high temperature.

If the pore size of the negative electrode are controlled as described in the first embodiment, the contact area between the negative electrode and the nonaqueous electrolyte is increased, with the result that the self-discharge noted above tends to be somewhat increased.

It should be noted that γ-butyrolactone tends to be reduced easily, compared with the linear carbonate and the cyclic carbonate. To be more specific, the solvents tend to be reduced in the order of γ-butyrolactone>>>ethylene carbonate>propylene carbonate>>dimethyl carbonate>methyl ethyl carbonate>diethyl carbonate in the order mentioned. Incidentally, the degree of difference in reactivity among the solvents is increased with increase in the number of signs of inequality ">" noted above.

Such being the situation, if γ-butyrolactone is contained in the nonaqueous electrolyte, a satisfactory film is formed on the surface of the negative electrode even under the operating potential region of the lithium-titanium oxide. As a result, the self-discharge of the battery is suppressed to improve the storage performance of the nonaqueous electrolyte battery under high temperatures.

This is also the case with the mixed solvent noted above.

Also, a similar effect can be obtained in the case of using the ionic liquid that can be reduced easily. It should also be noted that the ionic liquid also tends to be oxidized easily. Therefore, in the case of using the ionic liquid, the ionic liquid acts on the positive electrode to produce the effect of suppressing the self-discharge and the effect of improving the charge-discharge cycle life.

In order to form a more satisfactory protective film, it is desirable for the mixture of the organic solvents to contain 40 to 95% by volume of γ-butyrolactone.

The nonaqueous electrolyte containing γ-butyrolactone, which exhibits excellent effects as described above, has a high viscosity to lower the impregnation capability of the negative electrode with the nonaqueous electrolyte. However, in the case of using the negative electrode specified in the first embodiment, the negative electrode is allowed to be impregnated smoothly with the nonaqueous electrolyte even if the nonaqueous electrolyte contains γ-butyrolactone to improve the productivity and to improve the output performance and the charge-discharge cycle performance of the battery. It is also possible to obtain a similar effect in the case of using the ionic liquid because of high viscosity. It follows that the negative electrode in the first embodiment produces prominent effects in the case of using the nonaqueous electrolyte containing γ-butyrolactone or an ionic liquid and having a viscosity not lower than 5 cp at 20° C.

It is possible to set the upper limit of the viscosity of the nonaqueous electrolyte at 20° C. at 30 cp.

The nonaqueous electrolyte containing the ionic liquid will now be described.

The ionic liquid denotes a salt which partly exhibits a liquid state under the room temperature. The term "room temperature" denotes the temperature range within which the power source is assumed to be operated in general. The upper limit of the temperature range within which the power source is assumed to be operated in general is about 120° C., or about 60° C. in some cases, and the lower limit is about −40° C. or about −20° C. in some cases. It is desirable for the room temperature to fall within a range of −20° C. to 60° C.

The ionic liquid should desirably contain lithium ions, organic cations and organic anions. It is desirable for the ionic liquid to assume a liquid form even under the temperature not higher than room temperature.

The organic cation noted above includes, for example, quaternary ammonium ion and alkyl imidazolium ion having a skeleton represented by chemical formula (1) given below:

Formula (1)

It is desirable to use dialkyl imidazolium ion, trialkyl imidazolium ion and tetraalkyl imidazolium ion as the alkyl imidazolium ion noted above. The dialkyl imidazolium ion includes, for example, 1-methyl-3-ethyl imidazolium ion ($MEI^+$). The trialkyl imidazolium ion includes, for example, 1,2-diethyl-3-propyl imidazolium ion ($DMPI^+$). And the tetraalkyl imidazolium ion includes 1,2-diethyl-3,4(5)-dimethyl imidazolium ion.

On the other hand, the quaternary ammonium ion includes tetraalkyl ammonium ion and cyclic ammonium ion. The tetraalkyl ammonium ion noted above includes dimethyl ethyl methoxy ammonium ion, dimethyl ethyl methoxy methyl ammonium ion, dimethyl ethyl ethoxy ethyl ammonium ion, and trimethyl propyl ammonium ion.

In the case of using the alkyl imidazolium ion or the quaternary ammonium ion (particularly, tetraalkyl ammonium ion) as the organic cation, it is possible to lower the melting point of the nonaqueous electrolyte to 100° C. or less, more desirably to 20° C. or less. Further, it is possible to suppress the reactivity of the nonaqueous electrolyte with the negative electrode.

It is desirable for the lithium ion concentration to be not higher than 20 mol %, more desirably to fall within a range of 1 to 10 mol %. Where the lithium ion concentration falls within the range given above, the ionic liquid can be formed easily even under the low temperature not higher than 20° C. It is also possible to lower the viscosity of the nonaqueous electrolyte even under the temperature not higher than the room temperature to increase the ionic conductivity.

The anion contained in the ionic liquid is selected from the group consisting of, for example, $BF_4^-$, $PF_6^-$, $AsF_6^-$, $ClO_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. It is desirable for the organic cation noted above to be present together with at least one anion selected from the group given above. Where a plurality of anions are present together, an ionic liquid having a melting point not higher than 20° C. can be formed easily.

More desirably, it is possible to obtain an ionic liquid having a melting point not higher than 0° C. More desirable anions include, for example, $BF_4^-$, $CF_3SO_3^-$, $CF_3COO^-$, $CH_3COO^-$, $CO_3^{2-}$, $N(CF_3SO_2)_2^-$, $N(C_2F_5SO_2)_2^-$, and $(CF_3SO_2)_3C^-$. Where these anions are used, an ionic liquid having a melting point not higher than 0° C. can be formed easily.

5) Case

As the above case, a metallic container having a plate thickness of 0.5 mm or less or a laminate film container having a film thickness of 0.2 mm or less may be used. As the above metallic container, metallic cans which are made of aluminum, an aluminum alloy, iron or stainless and have a rectangular form or cylindrical form may be used.

As the laminate film, a multilayer film obtained by covering a metal foil with a resin film may be used. As the resin, polymers such as polypropylene (PP), polyethylene (PE), nylon and polyethylene terephthalate (PET) may be used. It is more desirable for the case to be formed of a metal sheet or a laminate film having a thickness not larger than 0.2 mm.

6) Negative Electrode

The negative electrode terminal may be formed from a material having electric stability and conductivity at a potential range from 0.4 to 3V with respect to a lithium metal potential. Example of this material include aluminum and aluminum alloys containing elements such as Mg, Ti, Zn, Mn, Fe, Cu and Si. In order to reduce contact resistance, the material is preferably the same as that of the negative electrode current collector.

7) Positive Electrode

The positive electrode terminal may be formed from a material having electric stability and conductivity at a potential range from 3V to 5V with respect to a lithium metal potential. Example of this material include aluminum and aluminum alloys containing elements such as Mg, Ti, Zn, Mn, Fe, Cu and Si. In order to reduce contact resistance, the material is preferably the same as that of the positive electrode current collector.

Figure 2:
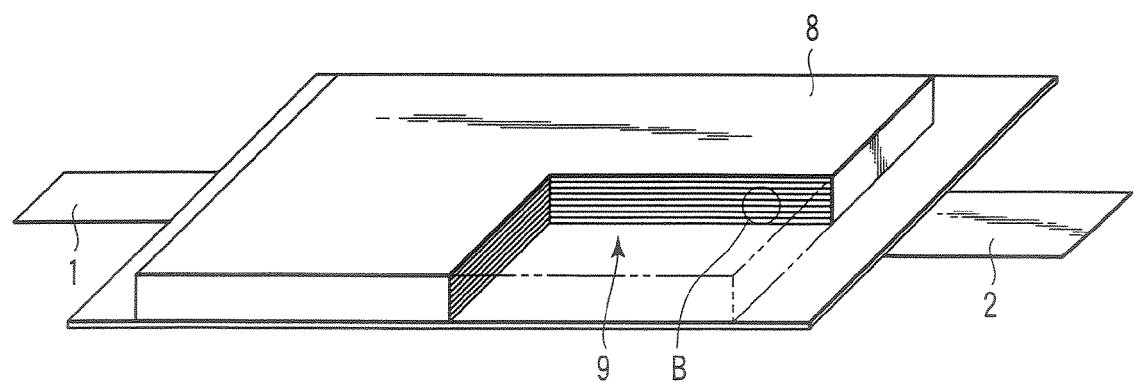
FIG. 2 is an oblique view, partly broken away, schematically exemplifying another construction of the nonaqueous electrolyte battery according to the first embodiment.
Figure 3:
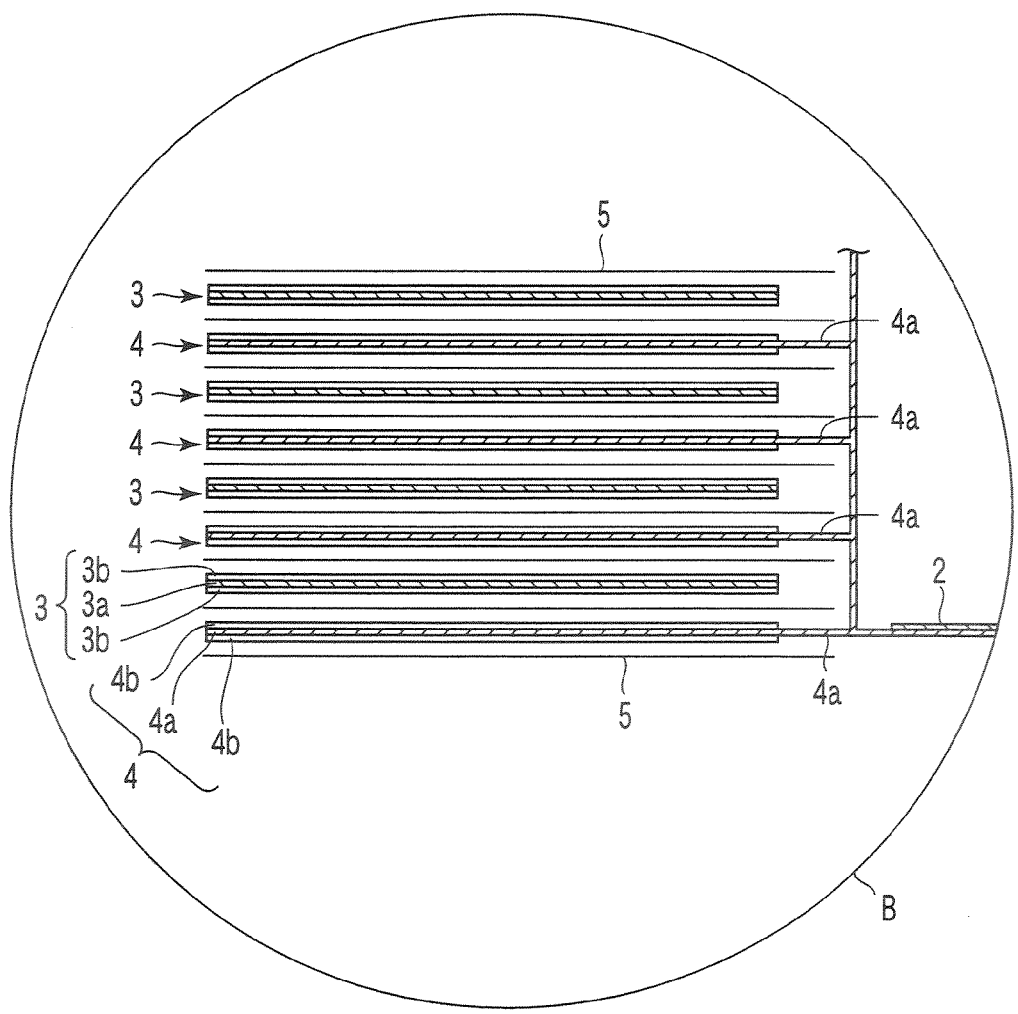
FIG. 3 is a cross-sectional view showing in a magnified fashion the construction of part B shown in FIG. 2.

The nonaqueous electrolyte battery according to the first embodiment is not limited to the structures shown in the above FIGS. 1A and 1B but may have the structures shown, for example, in FIGS. 2 and 3. FIG. 2 is an oblique view, partly broken away, schematically exemplifying another construction of the nonaqueous electrolyte battery according to the first embodiment. FIG. 3 is a cross-sectional view showing in a magnified fashion the construction of part B shown in FIG. 2.

As shown in FIG. 2, a stack type electrode group 9 is housed in a case 8 formed of a laminate film. As shown in FIG. 3, the stack type electrode group 9 is constructed such that a positive electrode 3 and a negative electrode 4 are stacked one upon the other a plurality of times alternately with a separator 5 interposed between the positive electrode 3 and the negative electrode 4. The electrode group 9 includes a plurality of the positive electrodes 3 each comprising a positive electrode current collector 3a and positive electrode active material-containing layers 3b supported on both surfaces of the positive electrode current collector 3a. The electrode group 9 also includes a plurality of the negative electrodes 4 each comprising a negative electrode current collector 4a and negative electrode active material-containing layers 4b supported on both surfaces of the negative electrode current collector 4a. One side of the negative electrode current collector 4a included in the negative electrode 4 protrudes from the positive electrode 3. The negative electrode current collector 4a protruding from the positive electrode 3 is electrically connected to a band-like negative electrode terminal 2. The tip portion of the band-like negative electrode terminal 2 is drawn to the outside from the case 8. Also, that side of the positive electrode current collector 3a included in the positive electrode 3 which is positioned on the side opposite to the protruding side of the negative electrode current collector 4a, though the protruding side of the positive electrode current collector 3a is not shown in the drawing. The positive electrode current collector 3a protruding from the negative electrode 4 is electrically connected to a band-like positive electrode terminal 1. The tip portion of the band-like positive electrode terminal 1 is positioned on the side opposite to the side of the negative electrode terminal 2 and is drawn to the outside from a side of case 8. In the flattened nonaqueous electrolyte secondary battery shown in FIGS. 2 and 3, the positive electrode terminal 1 and the negative electrode terminal 2 are drawn to the outside from the mutually facing two sides of the case 8.

Figure 4:
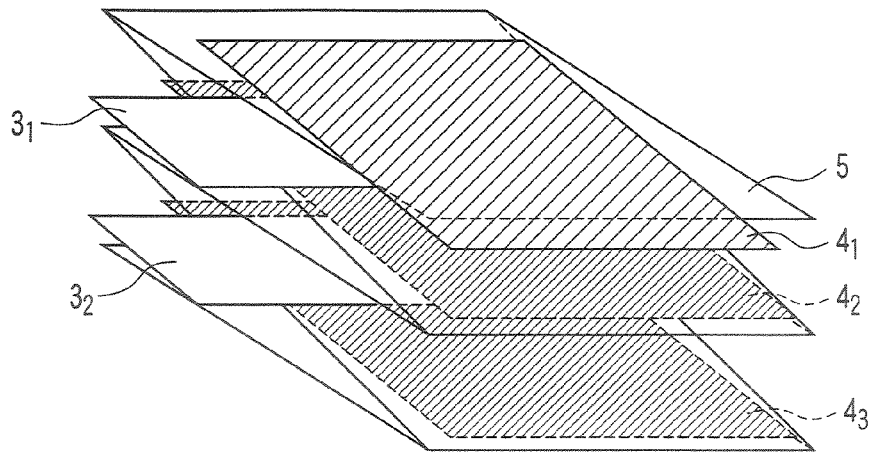
FIG. 4 is a perspective view showing an electrode group having a laminate structure and used in the nonaqueous electrolyte battery according to the first embodiment.

As the structure of the electrode group, a coil structure as shown in the aforementioned FIGS. 1A and 1B and a laminate structure as shown in the aforementioned FIGS. 2 and 3 were given as examples. It is preferable that the electrode group structure have a laminate structure to provide high safety and reliability in addition to excellent input and output performance. Moreover, in order to attain high performance under a high current even when the battery is used for a long time, it is preferable to adopt a structure in which the electrode group containing a positive electrode and a negative electrode have a laminate structure and the separator is folded in a zigzag shape upon use as shown in FIG. 4. A band separator 5 is folded in a zigzag shape. A strip negative electrode $4_1$ is laminated on the uppermost layer of the separator 5 folded in a zigzag shape. A strip positive electrode $3_1$, a strip negative electrode $4_2$, a strip positive electrode $3_2$ and a strip negative electrode $4_3$ are each inserted in this order from above into a part where the separators 5 are overlapped on each other. The positive electrodes 3 and the negative electrodes 4 are alternately arranged between the separators 5 piled in a zigzag shape to thereby obtain an electrode group having a laminate structure.

When the separator is folded in a zigzag shape, the three sides of each of the positive electrode and negative electrode are directly in contact with the nonaqueous electrolyte not through the separator and therefore, the nonaqueous electrolyte smoothly penetrates to the electrodes. Therefore, even if the nonaqueous electrolyte is consumed on the surface of the electrodes after the battery is used for a long time, the nonaqueous electrolyte is supplied smoothly, making it possible to attain excellent performance (input and output performance) under a large current for a long period. When a structure is adopted in which the separator has a bag form or the like though this structure has the same laminate structure, electrodes provided in the bag are in direct contact with the nonaqueous electrolyte only on one side and it is therefore difficult to supply the nonaqueous electrolyte smoothly. Therefore, when the nonaqueous electrolyte is consumed on the surface of the electrodes after the battery is used for a long time, the nonaqueous electrolyte is not supplied smoothly, bringing about gradually deteriorated performance (output and input performance) under a large current along with an increase in the frequency of use.

From the above results, it is preferable that the electrode group comprising a positive electrode and a negative electrode have a laminate structure and the separator isolating the positive electrode from the negative electrode spatially be arranged in such a manner that it is folded in a zigzag shape.

Second Embodiment

The battery pack according to a second embodiment comprises at least one nonaqueous electrolyte battery according to the first embodiment. It is desirable to structure a battery module by using, as a unit cell, the nonaqueous electrolyte battery according to the first embodiment and by connecting two or more of the unit cells electrically in series or in parallel.

The nonaqueous electrolyte battery according to the first embodiment is suitable to the formation of a battery module and the battery pack according to the second embodiment has excellent cycle performance. The details will be explained below.

When the ability of retaining the nonaqueous electrolyte is improved, the entire surface of the negative electrode active material can be in contact with the nonaqueous electrolyte and it becomes easy to equalize the concentration of lithium ions in the negative electrode active material. As a result, over voltage is applied with difficulty. Specifically, local overcharge and overvoltage are scarcely caused, and it is therefore possible to equalize the utilization factor of the negative electrode active material. This makes it possible to significantly reduce an individual difference in the capacities or impedances of the batteries. As a result, in a battery module formed of unit cells connected in series, for example, variations in the voltages of the fully charged unit cells along with the individual difference in the capacities of the unit cells can be decreased. Therefore, the battery pack according to the second embodiment is excellent in the controllability of the battery module and can improve the cycle performance.

Figure 6:
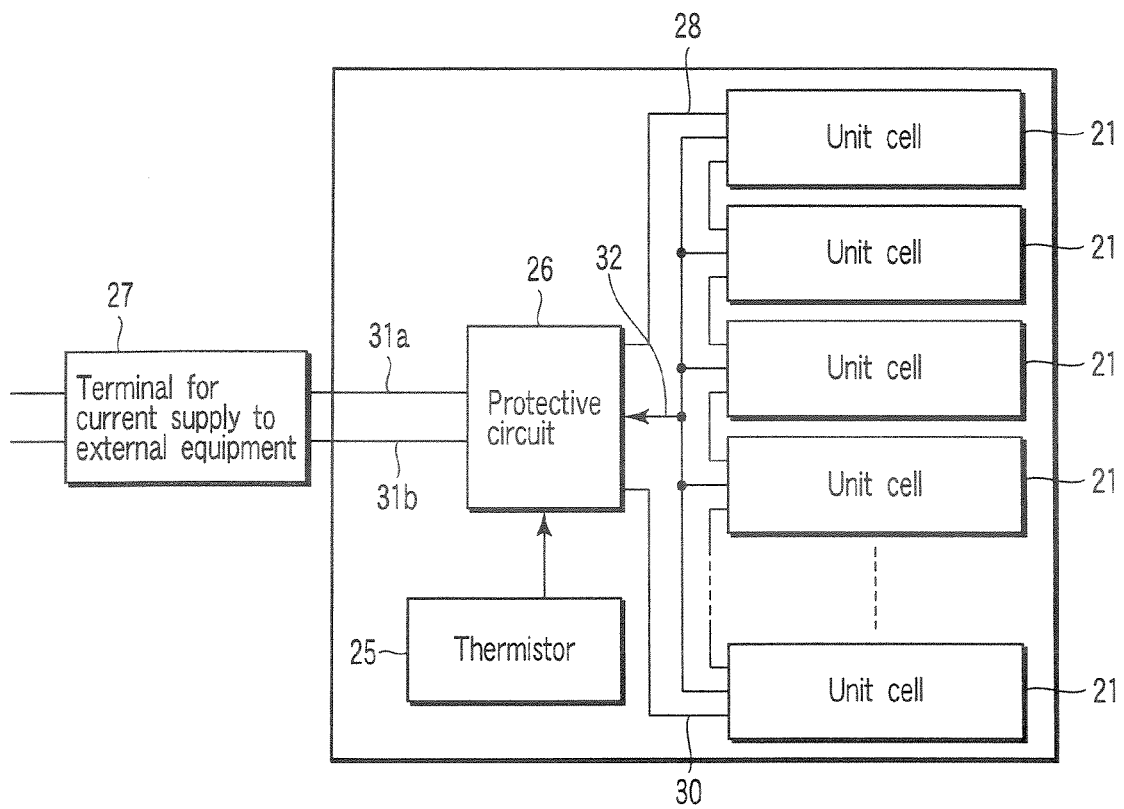
FIG. 6 is a block diagram showing an electric circuit of the battery pack of FIG. 5.

Each of a plurality of unit cells 21 included in the battery pack shown in FIG. 5 is formed of, though not limited to, a flattened type nonaqueous electrolyte battery constructed as shown in FIG. 1A. It is possible to use the flattened type nonaqueous electrolyte battery shown in FIG. 2 as the unit cell 21. The plural unit cells 21 are stacked one upon the other in the thickness direction in a manner to align the protruding directions of the positive electrode terminals 1 and the negative electrode terminals 2. As shown in FIG. 6, the unit cells 21 are connected in series to form a battery module 22. The unit cells 21 forming the battery module 22 are made integral by using an adhesive tape 23 as shown in FIG. 5.

A printed wiring board 24 is arranged on the side surface of the battery module 22 toward which protrude the positive electrode terminals 1 and the negative electrode terminals 2. As shown in FIG. 6, a thermistor 25, a protective circuit 26 and a terminal 27 for current supply to the external equipment are connected to the printed wiring board 24.

As shown in FIGS. 5 and 6, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 6, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 1 and the negative electrode terminals 2. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 5 and 6 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

With regard to the applications of the battery pack of the second embodiment, those are used in the field requiring the large current performance and the charge-discharge cycle. Specifically, examples of the applications include battery packs to be used as power sources for digital cameras and battery packs to be installed in vehicles such as two- to four-wheeled hybrid automobiles, two- to four-wheeled automobiles, and electric mopeds. Particularly those to be installed in vehicles are preferable.

In this case, when the nonaqueous electrolyte contains a mixture solvent prepared by blending at least two types selected from the group consisting of propylene carbonate (PC), ethylene carbonate (EC) and γ-butyrolactone (GBL), or γ-butyrolactone (GBL), applications for which high-temperature performance is desired are preferable. Specifically, the aforementioned vehicle applications are exemplified.

Third Embodiment

A vehicle according to a third embodiment comprises the battery pack according to the second embodiment. The vehicle noted above includes, for example, a hybrid electric automobile having 2 to 4 wheels, an electric automobile having 2 to 4 wheels, and an electric moped.

Figure 7:
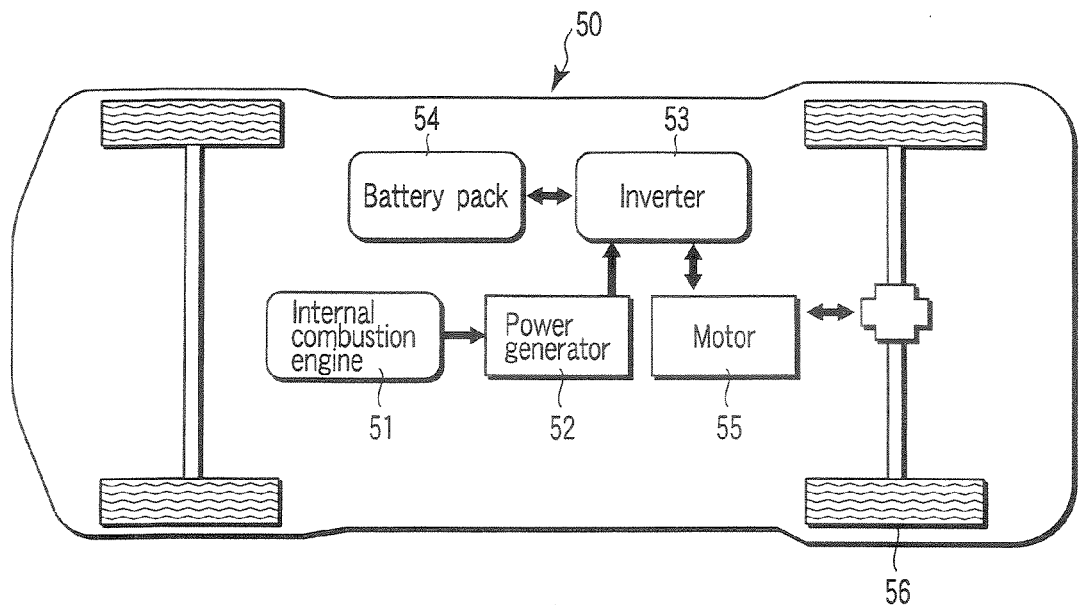
FIG. 7 is a typical view showing a series hybrid car according to a third embodiment.
Figure 8:
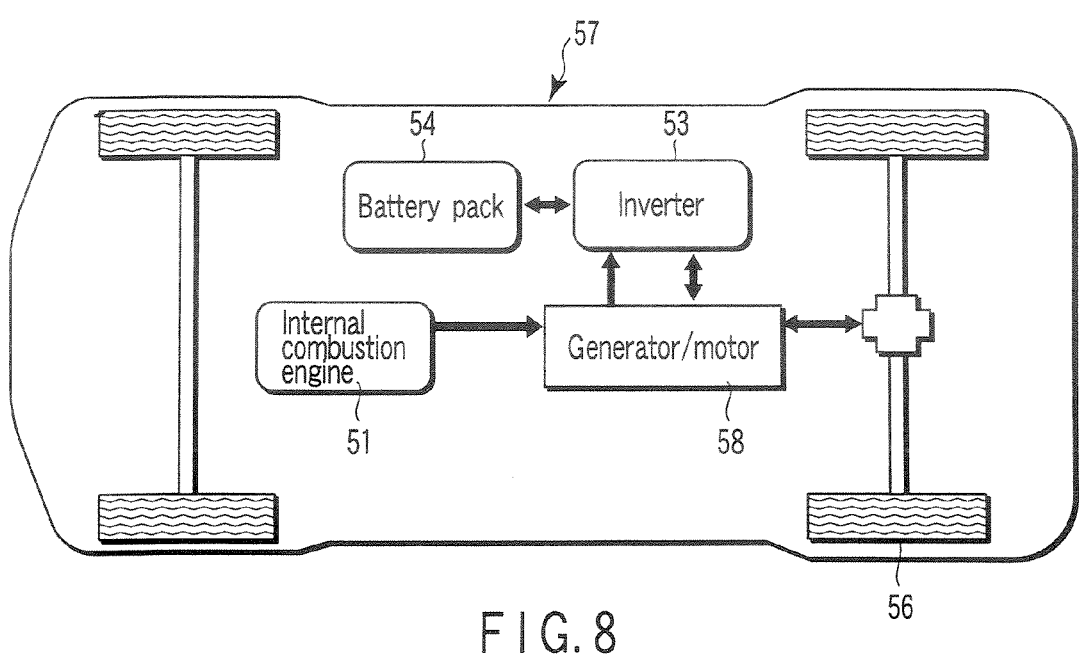
FIG. 8 is a typical view showing a parallel hybrid car according to the third embodiment.
Figure 9:
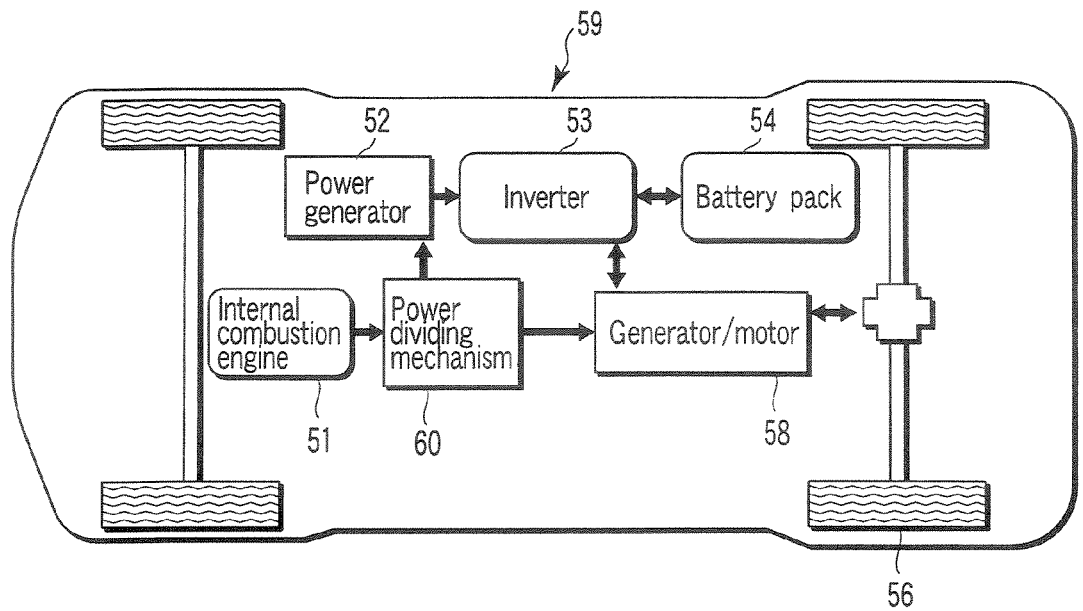
FIG. 9 is a typical view showing a series-parallel hybrid car according to the third embodiment.

FIGS. 7 to 9 show various type of hybrid vehicles in which an internal combustion engine and a motor driven by a battery pack are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 7 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 7 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above denotes the capacity at the time when the battery pack is discharged at a rate of 0.2 C.

FIG. 8 shows the construction of a hybrid vehicle 57 that is called a parallel hybrid vehicle. A reference numeral 58 shown in FIG. 8 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 8 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 9 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 5 to 10 Ah.

It is desirable for the nominal voltage of the battery pack included in the hybrid vehicles as shown in FIGS. 7 to 9 to fall within a range of 200 to 600V.

The battery pack according to embodiments of the present invention is adapted for use in the series-parallel hybrid vehicle.

Figure 10:
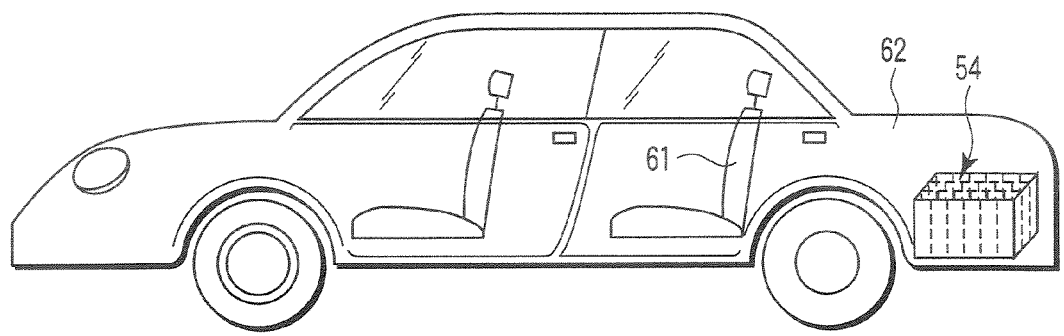
FIG. 10 is a typical view showing a car according to the third embodiment.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 10, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 11:
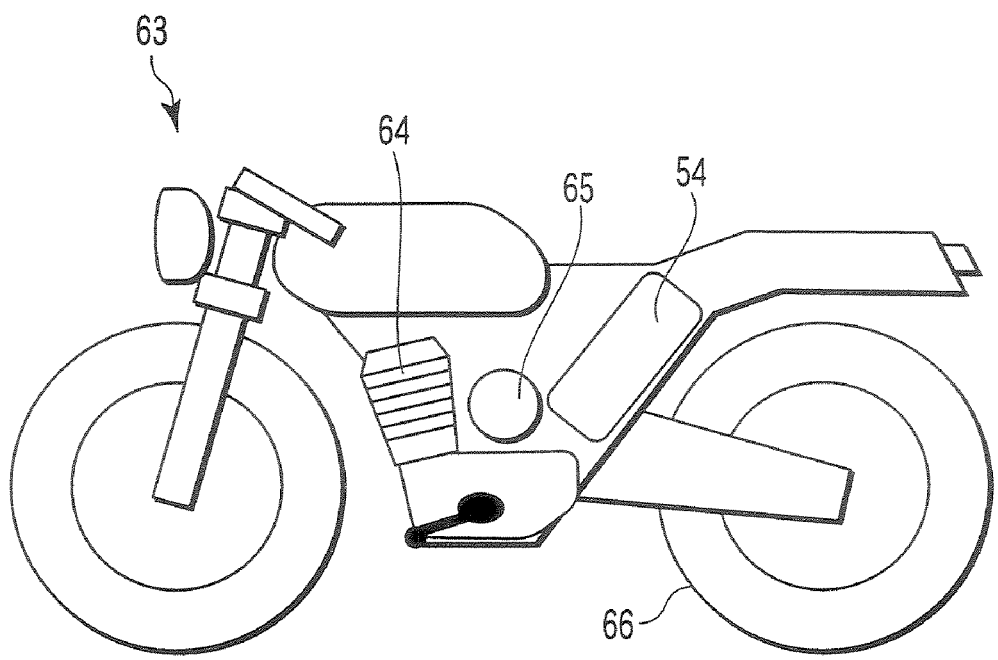
FIG. 11 is a typical view showing a hybrid motorcycle according to the third embodiment.

FIG. 11 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 12:
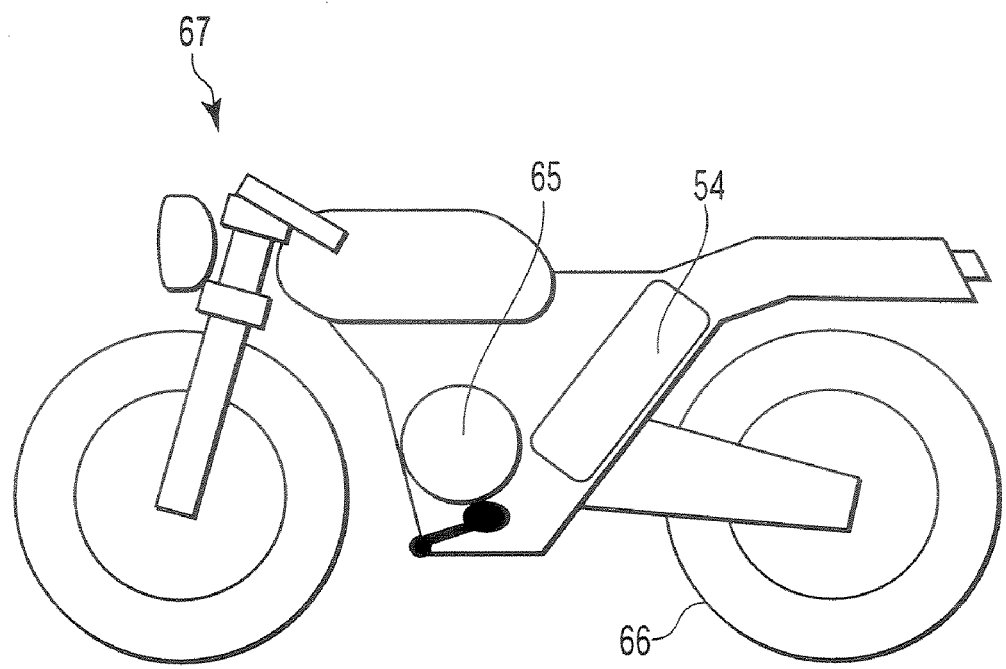
FIG. 12 is a typical view showing an electric motorcycle according to the third embodiment.

FIG. 12 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

FIG. 13 shows an example of a chargeable vacuum cleaner according to the third embodiment. The chargeable vacuum cleaner comprises a battery pack according to the second embodiment, the pack being stored in a casing 70 of the vacuum cleaner. Also, the chargeable vacuum cleaner is provided with a charger 71 which doubles as a support stand. The rated capacity of the battery pack is preferably designed to be in the range of 2 to 10 Ah. A more preferable range is from 2 to 4 Ah. Also, the nominal voltage of the battery pack is preferably designed to be in the range of 40 to 80V.

Described in the following are Examples of the present invention. Needless to say, the technical scope of the present invention is not limited to the following Examples as far as the subject matter of the present invention is not exceeded.

EXAMPLE 1

Preparation of Positive Electrode

A slurry was prepared by adding 90% by weight of lithium-nickel-cobalt-manganese oxide ($LiNi_{1/3}CO_{1/3}Mn_{1/3}O_2$), which was used as a positive electrode active material, 5% by weight of acetylene black, which was used as an electrically conductive agent, and 5% by weight of polyvinylidene fluoride (PVdF), which was used as a binder, to N-methyl pyrrolidone (NMP), while stirring the mixture. Then, the both surfaces of a current collector formed of an aluminum foil having an average crystal grain size of 30 µm were coated with the slurry, followed by drying the coating and subsequently pressing the current collector coated with the slurry so as to obtain a positive electrode having an electrode density of 3.3 g/cm$^3$.

<Preparation of Negative Electrode>

Prepared as a negative electrode active material was a lithium titanate powder having a spinel structure, having an average particle diameter of 0.7 µm, having a BET specific surface area of 10.4 m$^2$/g as measured by the N$_2$ adsorption, having 1.55V (vs. Li/Li$^+$) of the lithium ion insertion potential, and having a composition represented by Li$_4$Ti$_5$O$_{12}$.

<Particle Diameter>

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle diameter distribution data.

<Lithium Ion Insertion Potential>

The negative electrode was cut into small pieces each sized at 2 cm×2 cm to obtain working electrodes. The working electrode was arranged to face a counter electrode formed of a lithium metal foil sized at 2.2 cm×2.2 cm with a glass filter (separator) interposed therebetween, and a lithium metal used as a reference electrode was inserted so as not to be brought into contact with any of the working electrode and the counter electrode. These electrodes were put in a glass cell of a three pole type such that each of the working electrode, the counter electrode and the reference electrode was connected to the terminal of the glass cell. Under the particular condition, 25 mL of an electrolytic solution, which was prepared by dissolving LiBF$_4$ in a concentration of 1.5 mol/L in a mixed solvent prepared by mixing ethylene carbonate (EC) and γ-butyrolactone (GBL) in a mixing ratio by volume of 1:2, was poured into the glass cell such that the separator and the electrodes were sufficiently impregnated with the electrolytic solution, followed by hermetically closing the glass cell. The glass cell thus manufactured was arranged in a constant temperature bath maintained at 25° C. to measure the lithium ion insertion potential of the working electrode at the time when the glass cell was charged with a current density of 0.1 mA/cm$^2$.

For preparing a slurry, added to N-methyl pyrrolidone (NMP) were 90% by weight of the negative electrode active material, 5% by weight of coke, and 5% by weight of polyvinylidene fluoride (PVdF), which was used as a binder. The coke, which was used as an electrically conductive agent, was baked at 1,300° C., had a layer spacing d$_{002}$ of 0.3465 nm, had an average particle diameter of 10 µm, and also had a BET specific surface area of 11.2 m$^2$/g. The negative electrode active material, the coke and the binder were added to NMP such that the mixture contained 56% of the solid components. The mixture was kneaded by using a planetary mixer while adding NMP to the mixture so as to lower gradually the concentration of the solid components, thereby preparing a slurry. When measured by a B-type viscometer, the viscosity of the slurry was found to be 10.2 cp at 50 rpm. The slurry was further mixed by using a bead mill equipped with zirconia balls each having a diameter of 1 mm as the mixing media.

In the next step, both surfaces of a current collector formed of an aluminum foil having a thickness of 15 µm, a purity of 99.99% and an average crystal grain size of 10 µm were coated with the resultant slurry, followed by drying the coated slurry and subsequently subjecting the current collector coated with the slurry to a roll press by using rolls heated to 100° C. so as to obtain a negative electrode having an electrode density as shown in Table 1.

The pore diameter distribution in the negative electrode thus obtained was measured by mercury porosimetry as follows so as to obtain a pore diameter distribution as shown in FIG. 14. In the graph of FIG. 14, the log differential intrusion is plotted on the ordinate on the right side, and the cumulative intrusion is plotted on the ordinate on the left side. The mode diameter denotes the pore diameter at the peak top of the log differential intrusion. In the case of FIG. 14, the mode diameter is 0.05 µm. On the other hand, the median diameter denotes the pore diameter at 50% of the cumulative volume frequency in the cumulative intrusion curve. In the case of FIG. 14, the median diameter is 3 µm. Table 2 also shows the mode diameter and the median diameter. Table 2 further shows the pore diameter ratio of the mode diameter to the median diameter.

The mode diameter and median diameter were calculated from the pore diameter distribution of the negative electrode measured by the mercury porosimetry. As a device for measuring the pore diameter distribution, Autopore 9520 model manufactured by Shimadzu Corporation was used. The sample was cut into strips of a size of about 25×25 mm$^2$ and the strip was folded and taken in a measuring cell to measure in the condition that the initial pressure was 20 kPa which is correspond to about 3 psia and is a pressure corresponding to the pore diameter of about 60 µm. When rearranging data, the specific surface area of pores was calculated on the premise that the pores each had a cylindrical form.

It should be noted that the analytical principle of the mercury porosimetry is based on Washburn's equation (2):

$$D = -4\gamma \cos \theta / P \qquad \text{Equation (2)}$$

Here, P is a pressure to be applied, D is a pore diameter, γ is the surface tension of mercury and is 480 dyne·cm$^{-1}$, and θ is a contact angle of mercury with the wall surface of pores and is 140°. γ and θ are constants and therefore, the relation between the applied pressure P and the pore diameter D is found from Washburn's equation. If mercury penetration volume at this time is measured, the pore diameter and its volumetric distribution can be found. As to the details of measuring method, principle and the like, please refer to, for example, Motoji Zimbo et al., "Microparticle Handbook" Asakura Shoten, (1991) and Sohachiro Hayakawa, "Powder Property Measuring Method", Asakura Shoten (1978).

Also, the density of the negative electrode was measured as follows.

Specifically, the negative electrode having the both surfaces coated with the slurry was cut into small piece sized at 2 cm×2 cm so as to measure the weight W1 (g) and the thickness T1 (cm) of the piece. Likewise, the current collector was cut into small piece sized at 2 cm×2 cm so as to measure the weight W2 and the thickness T2 of the piece. The density (D) of the negative electrode was calculated by using formula (3) given below:

$$D(\text{density}) = \{(W1 - W2)/4\}/(T1 - T2) \qquad (3)$$

<Preparation of Electrode Group>

Prepared was an electrode group comprising a positive electrode, a separator formed of a polyethylene porous film having a thickness of 25 µm, a negative electrode, and another separator, which were laminated one upon the other in the order mentioned such that the separator was arranged zigzag. The electrode group of the particular construction was subjected to a hot press at 90° C. so as to obtain a flattened electrode group sized at 70×100 mm and having a thickness of 3.0 mm. The electrode group thus prepared was housed in a pack formed of a laminate film having a thickness of 0.1 mm. The laminate film included an aluminum foil having a thickness of 40 μm and polypropylene layers formed on both surfaces of the aluminum foil. The electrode group housed in the pack was subjected to a vacuum drying at 80° C. for 24 hours.

<Preparation of Nonaqueous Electrolyte>

A liquid nonaqueous electrolyte was prepared by dissolving $LiBF_4$ used as an electrolyte in a mixed solved prepared by mixing ethylene carbonate (EC) and γ-butyrolactone (GBL) at the mixing ratio by volume of 1:2. The electrolyte was dissolved in the mixed solvent in an amount of 1.5 mol/L. The viscosity at 20° C. of the liquid nonaqueous electrolyte thus prepared was found to be 7.1 cp as measured by a B-type viscometer.

After the liquid nonaqueous electrolyte was poured into the laminate film pack having the electrode group housed therein, the pack was sealed using a heat seal so as to obtain a nonaqueous electrolyte secondary battery constructed as shown in FIG. 6, sized at 80×120 mm and had a thickness of 3.0 mm.

EXAMPLES 2 TO 12 AND COMPARATIVE EXAMPLES 1 TO 3

A negative electrode was manufactured as in Example 1, except that the average particle diameter of the negative electrode active material, the average particle diameter of the negative electrode electrically conductive agent, the negative electrode density, and the solid component ratio in the slurry used for manufacturing the negative electrode were changed as shown in Table 1. Table 2 shows the mode diameter and the median diameter of the negative electrode, as well as the pore diameter ratio of the mode diameter to the median diameter. Also, a nonaqueous electrolyte secondary battery was manufactured as in Example 1, except that used was the negative electrode shown in Tables 1 and 2. Incidentally, the viscosity at 20° C. of the nonaqueous electrolyte used in Example 6 was found to be 6.8 cp as measured by the B-type viscometer.

COMPARATIVE EXAMPLE 4

Prepared as a negative electrode active material was a carbonaceous material having an average particle diameter as shown in Table 1 and having an lithium ion insertion potential of 0.15V (vs. $Li/Li^+$).

Then, 90% by weight of the negative electrode active material, 5% by weight graphite having an average particle diameter of 6 μm, which was used as an electrically conductive agent, and 5% by weight of polyvinylidene fluoride (PVdF) were added to N-methyl pyrrolidone (NMP) such that the resultant mixture contained the solid components in an amount shown in Table 1. Further, the mixture was kneaded in a planetary mixer under the conditions that the ball diameter and the stirring time of the planetary mixer were set substantially equal to those for Example 1 so as to obtain a slurry. In the next step, both surfaces of a current collector formed of a copper foil having a thickness of 12 μm were coated with the slurry thus prepared, followed by drying the coated slurry and, then, subjecting the current collector coated with the slurry to a roll press so as to obtain a negative electrode. Table 1 shows the density of the negative electrode thus obtained. Also, Table 2 shows the mode diameter and the median diameter of the negative electrode, as well as the pore diameter ratio of the mode diameter to the median diameter. Finally, a nonaqueous electrolyte secondary battery was manufactured as in Example 1, except that used was the negative electrode prepared as described above.

The input-output power density of the secondary battery thus obtained was measured under an environment of 25° C. as follows. In the first step, the discharge pulse and the charging pulse were measured as follows.

(Measurement of Discharge Pulse):

The secondary battery under the charged state was discharged to 50% of SOC (state of charge) under an environment of 25° C. Then, a pulse discharge was carried out under different current values. The current was increased by 20 A every time the value of the current was changed. To be more specific, the pulse discharge was carried out under a current of 20 A, 40 A, 60 A, etc. Also, the pulse discharge under the same current was continued for 5 seconds. Further, a charge-discharge cycle of the secondary battery was repeated such that the secondary battery was charged for compensating for the discharged electricity under the current of 20 A between the adjacent pulse discharge operations to decrease the variations in SOCs of each pulse discharge operation as much as possible. In the stage of the pulse discharge, the pulse current value was increased until the battery voltage was lowered to Y (1.5)V or lower.

(Measurement of Charging Pulse):

After measurement of the discharge pulse, a charge-discharge cycle of the secondary battery was repeated by imparting a charging pulse until the battery voltage was increased to X (2.8)V, followed by discharging the secondary battery under a current of 20 A so as to compensate for the charged electricity.

(Input-Output Power Density):

The current-voltage curve was prepared by plotting the battery voltage at the finishing time of each pulse measurement as the function of the pulse current. The maximum current value among the current values until the cut-off charging voltage of 2.8V and the maximum current value among the current values until the cut-off discharging voltage of 1.5V were obtained from the current-voltage curve. Then, the input power density was calculated by dividing the product of the maximum current value and the cut-off charging voltage by the battery weight. The output power density was calculated by dividing the product of the maximum current value and the cut-off discharging voltage by the battery weight.

Also, a charge-discharge cycle test was applied to each secondary battery such that the secondary battery was charged for one hour under a constant voltage of 2.8V, followed by discharging the secondary battery under a constant current of 600 mA until the battery voltage was lowered to 1.5V. The number of charge-discharge cycles was counted at the time when the battery capacity was lowered to 80% of the initial capacity. Table 2 shows the experimental data.

Figure 15:
FIG. 15 is an SEM photo showing a cross-section that was obtained when the negative electrode of the nonaqueous electrolyte battery for Example 1 was cut in a direction perpendicular to the current collector.
Figure 16:
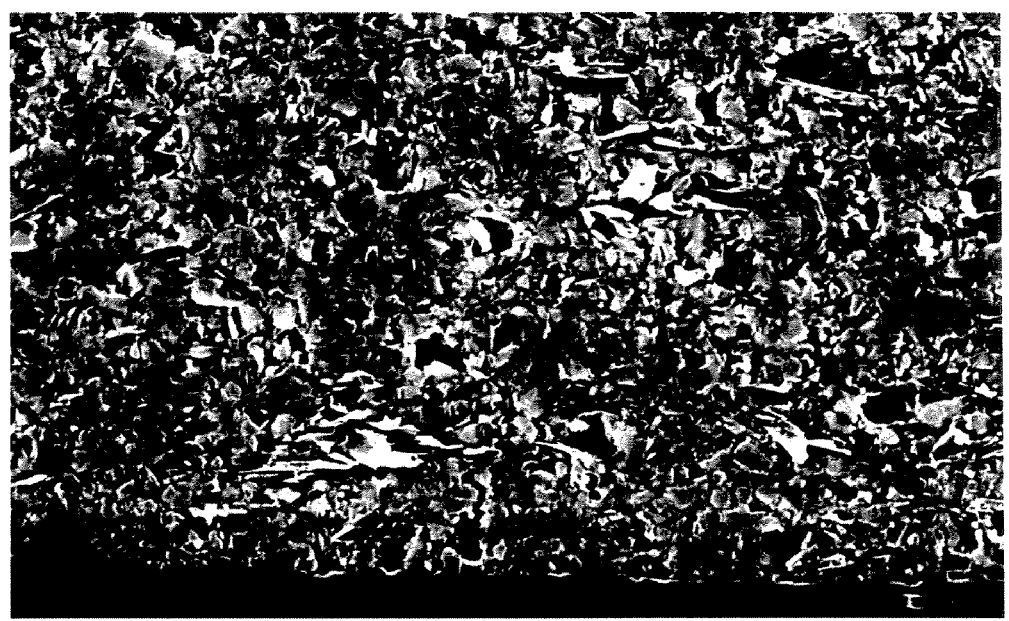
FIG. 16 is an SEM photo showing a cross-section that was obtained when the negative electrode of the nonaqueous electrolyte battery for Comparative Example 1 was cut in a direction perpendicular to the current collector.

Each of FIGS. 15 and 16 is an SEM photo showing a cross-section of the negative electrode manufactured in each of Example 1 and Comparative Example 1 and cut in a direction perpendicular to the negative electrode current collector.

As apparent from the comparison between FIGS. 15 and 16, pores larger than those inside the negative electrode for Comparative Example 1 were found to be present inside the negative electrode for Example 1. It was also confirmed by the SEM photo that 3 to 10 pores each having a cross-sectional area of 2 $\mu m^2$ to 10 $\mu m^2$ were present per 100 $\mu m^2$ of the cross section of the negative electrode.

TABLE 1

|  | Positive electrode active material | Nonaqueous electrolyte | Negative electrode active material | Average particle diameter of negative electrode active material (μm) |
|---|---|---|---|---|
| Example 1 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 2 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 3 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 4 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 5 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 6 | $LiNi_{1/3}Co_{1/3}Mn_{1/3}O_2$ | 1.5M $LiBF_4$-EC/PC/GBL(1:1:4) | $Li_4Ti_5O_{12}$ | 0.7 |
| Example 7 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 8 | $LiNi_{1/3}Co_{1/3}Mn_{1/3}O_2$ | 1.5M $LiBF_4$-EC/GBL(1:2) | $Li_4Ti_5O_{12}$ | 0.7 |
| Example 9 | $LiNi_{1/3}Co_{1/3}Mn_{1/3}O_2$ | 1.5M $LiBF_4$-EC/GBL(1:2) | $Li_4Ti_5O_{12}$ | 0.6 |
| Example 10 | $LiNi_{1/3}Co_{1/3}Mn_{1/3}O_2$ | 1.5M $LiBF_4$-EC/GBL(1:2) | $Li_4Ti_5O_{12}$ | 0.55 |
| Example 11 | $LiNi_{1/3}Co_{1/3}Mn_{1/3}O_2$ | 1.5M $LiBF_4$-EC/GBL(1:2) | $Li_4Ti_5O_{12}$ | 0.65 |
| Example 12 | $LiNi_{1/3}Co_{1/3}Mn_{1/3}O_2$ | 1.5M $LiBF_4$-EC/GBL(1:2) | $Li_4Ti_5O_{12}$ | 0.5 |
| Comparative Example 1 | $LiNi_{1/3}Co_{1/3}Mn_{1/3}O_2$ | 1.5M $LiBF_4$-EC/GBL(1:2) | $Li_4Ti_5O_{12}$ | 0.9 |
| Comparative Example 2 | $LiNi_{1/3}Co_{1/3}Mn_{1/3}O_2$ | 1.5M $LiBF_4$-EC/GBL(1:2) | $Li_4Ti_5O_{12}$ | 0.7 |
| Comparative Example 3 | $LiNi_{1/3}Co_{1/3}Mn_{1/3}O_2$ | 1.5M $LiBF_4$-EC/GBL(1:2) | $Li_4Ti_5O_{12}$ | 0.7 |
| Comparative Example 4 | $LiNi_{1/3}Co_{1/3}Mn_{1/3}O_2$ | 1.5M $LiBF_4$-EC/GBL(1:2) | Carbonaceous material | 3 |

|  | Negative electrode electrically conductive agent | Average particle diameter of negative electrode electrically conductive agent (μm) | Negative electrode density (g/cc) | Negative electrode solid material ratio (%) | Ball diameter (mm) | Stirring time (minutes) |
|---|---|---|---|---|---|---|
| Example 1 | Coke | 10 | 2.3 | 56 | 1 | 30 |
| Example 2 | Coke | 3 | 2.3 | 56 | 1 | 30 |
| Example 3 | Coke | 3 | 2.3 | 55.5 | 1 | 30 |
| Example 4 | Coke | 3 | 2.3 | 55 | 1 | 30 |
| Example 5 | Coke | 0.1 | 2.3 | 55 | 1 | 30 |
| Example 6 | Coke | 3 | 2.3 | 55 | 1 | 30 |
| Example 7 | Coke | 3 | 1.5 | 56 | 1 | 30 |
| Example 8 | Coke | 3 | 2.6 | 56 | 1 | 30 |
| Example 9 | Coke | 3 | 2.3 | 54.5 | 1 | 30 |
| Example 10 | Coke | 3 | 2.6 | 54 | 1 | 30 |
| Example 11 | Coke | 2 | 2.35 | 56 | 2 | 20 |
| Example 12 | Coke | 10 | 2.25 | 54 | 0.5 | 40 |
| Comparative Example 1 | Coke | 3 | 2.3 | 57 | 1 | 30 |
| Comparative Example 2 | Coke | 0.05 | 2.3 | 56 | 1 | 30 |
| Comparative Example 3 | Coke | 3 | 2.8 | 56 | 1 | 30 |
| Comparative Example 4 | Graphite | 6 | 1.5 | 59 | 1 | 30 |

TABLE 2

|  | Median diameter of negative electrode pore (μm) | Mode diameter of negative electrode pore (μm) | Pore diameter ratio (mode diameter/median diameter) | Input density (5 seconds, SOC 50%) (W/kg) | Output density (5 seconds, SOC 50%) (W/kg) | Cycle life (the number of cycles) |
|---|---|---|---|---|---|---|
| Example 1 | 3.0 | 0.05 | 0.017 | 4080 | 3080 | 620 |
| Example 2 | 1.0 | 0.05 | 0.050 | 4000 | 3000 | 620 |
| Example 3 | 1.7 | 0.05 | 0.029 | 4050 | 3050 | 620 |
| Example 4 | 2.8 | 0.05 | 0.018 | 4100 | 3100 | 630 |
| Example 5 | 1.0 | 0.05 | 0.050 | 4000 | 3000 | 590 |
| Example 6 | 2.8 | 0.05 | 0.018 | 4100 | 3100 | 650 |
| Example 7 | 2.5 | 0.05 | 0.020 | 4070 | 3070 | 600 |
| Example 8 | 1.5 | 0.05 | 0.033 | 4060 | 3060 | 600 |
| Example 9 | 2.9 | 0.05 | 0.017 | 4090 | 3090 | 600 |
| Example 10 | 3.0 | 0.05 | 0.017 | 4100 | 3100 | 590 |
| Example 11 | 1.0 | 0.1 | 0.10 | 3750 | 2800 | 580 |
| Example 12 | 3.0 | 0.03 | 0.010 | 3900 | 2950 | 550 |
| Comparative Example 1 | 0.1 | 0.1 | 1 | 2800 | 2400 | 480 |
| Comparative Example 2 | 0.1 | 0.05 | 0.5 | 2700 | 2200 | 280 |
| Comparative Example 3 | 0.8 | 0.05 | 0.063 | 3000 | 2700 | 350 |

TABLE 2-continued

| | Median diameter of negative electrode pore (μm) | Mode diameter of negative electrode pore (μm) | Pore diameter ratio (mode diameter/median diameter) | Input density (5 seconds, SOC 50%) (W/kg) | Output density (5 seconds, SOC 50%) (W/kg) | Cycle life (the number of cycles) |
|---|---|---|---|---|---|---|
| Comparative Example 4 | 0.75 | 1.2 | 1.6 | 2200 | 1700 | 200 |

In the secondary battery for each of Examples 1 to 12, the median diameter was not smaller than 1 μm, and the ratio of the mode diameter to the median diameter was not higher than 1/10, i.e., not larger than 0.1. As apparent from Tables 1 and 2, the secondary battery for each of these Examples was found to be superior to that for Comparative Examples 1 to 4 in each of the input-output power density under the large current and in the charge-discharge cycle life. In particular, the secondary battery for each of Examples 1 to 10, in which the ratio of the mode diameter to the median diameter was 0.017 to 0.05, was found to be superior to that for each of Examples 11 to 12 in each of the input-output power density under a large current and in the charge-discharge cycle life.

Also, the median diameter of the secondary battery for each of Examples 1 and 3 was larger than that of the secondary battery for Example 2, which was 1 μm. It can be understood by comparison of Examples 1 to 3 that the secondary battery for each of Examples 1 and 3 exhibited an input-output power density higher than that of the secondary battery for Example 2.

The secondary battery for Example 2 was equal to the secondary battery for Example 5 in the mode diameter and the median diameter, with the result that no difference was recognized in the input-output power density between Examples 2 and 5. However, Example 2 was found to be superior to Example 5 in the charge-discharge cycle life. Such being the situation, it is considered reasonable to understand that, in order to obtain sufficient charge-discharge cycle performance, it is desirable for the electrically conductive agent to have an average particle diameter not smaller than 1 μm.

The secondary battery for Example 4 was equal to the secondary battery for Example 6 in the mode diameter and the median diameter, with the result that no difference was recognized in the input-output power density between Examples 4 and 6. However, Example 6 was found to be superior to Example 4 in the charge-discharge cycle life. Such being the situation, it is considered reasonable to understand that the charge-discharge cycle performance of the secondary battery can be improved in the case of using a mixed solvent containing γ-butyrolactone, propylene carbonate (PC) and ethylene carbonate (EC) as the nonaqueous solvent.

Further, it can be understood by comparison of Examples 1, 9 and 10 that the input-output power density can be increased with decrease in the average particle diameter of the negative electrode active material, and that the charge-discharge cycle performance can be improved with increase in the average particle diameter of the negative electrode active material.

On the other hand, in each of Comparative Examples 1 and 2, the median diameter was smaller than 1 μm, and the ratio of the mode diameter to the median diameter exceeded 1/10, i.e., exceeded 0.1. As a result, these Comparative Examples were found to be inferior to Examples 1 to 12 in the input-output power density under a large current and in the charge-discharge cycle life. Also, in Comparative Example 1, the average particle diameter of the negative electrode active material exceeded 0.7 μm, and the solid component ratio in the slurry component of the negative electrode was high, i.e., 57%. Such being the situation, it is considered reasonable to understand that the dispersion capability of each of the negative electrode active material and the electrically conductive agent was markedly improved and, thus, the median diameter and the mode diameter of the pore diameter distribution in the negative electrode were made equal to each other. On the other hand, in Comparative Example 2, the average particle diameter of the negative electrode electrically conductive agent was small, i.e., smaller than 0.1 μm. Therefore, it is considered reasonable to understand that the electrically conductive agent was uniformly dispersed in the negative electrode active material and, thus, the median diameter was rendered smaller than 1 μm.

Also, in Comparative Example 3, the median diameter was smaller than 1 μm, though the ratio of the mode diameter to the median diameter was not higher than 1/10, i.e., not larger than 0.1. As a result, the secondary battery for Comparative Example 3 was rendered inferior to the secondary battery for each of Examples 1 to 12 in each of the input-output power density under the large current and in the charge-discharge cycle performance. Also, in Comparative Example 3, the negative electrode density was increased to 2.8 g/cc, with the result that the median diameter was rendered smaller than 1 μm.

Further, in Comparative Example 4, a carbonaceous material was used as the negative electrode active material. In this case, the median diameter was made smaller than 1 μm. In addition, the ratio of the mode diameter to the median diameter exceeded 1. Such being the situation, the secondary battery for Comparative Example 4 was inferior to the secondary battery for each of Examples 1 to 12 in each of the input-output power density under the large current and in the charge-discharge cycle life.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:
   a positive electrode;
   a negative electrode containing a negative electrode active material which has a lithium ion insertion potential of 0.4V (vs. Li/Li$^+$) or higher and a pore diameter distribution in which a median diameter is not smaller than 1 μm and a mode diameter is not larger than 1/10 of the median diameter, and the pore diameter distribution being measured by mercury porosimetry; and
   a nonaqueous electrolyte.

2. The nonaqueous electrolyte battery according to claim 1, wherein a density of the negative electrode falls within a range of 1.5 to 2.6 g/cm$^3$.

3. The nonaqueous electrolyte battery according to claim 1, wherein the median diameter falls within a range of 1 to 3 μm.

4. The nonaqueous electrolyte battery according to claim 1, wherein the negative electrode active material is formed of lithium-titanium oxide having an average particle diameter not larger than 0.7 μm.

5. The nonaqueous electrolyte battery according to claim 4, wherein the lithium-titanium oxide has a spinel structure.

6. The nonaqueous electrolyte battery according to claim 1, wherein the nonaqueous electrolyte contains at least two solvents selected from the group consisting of propylene carbonate, ethylene carbonate and γ-butyrolactone.

7. The nonaqueous electrolyte battery according to claim 1, wherein a ratio of the mode diameter to the median diameter falls within a range of 0.01 to 0.1.

8. The nonaqueous electrolyte battery according to claim 1, wherein a ratio of the mode diameter to the median diameter falls within a range of 0.017 to 0.05.

9. A battery pack comprising a nonaqueous electrolyte battery, wherein the nonaqueous electrolyte battery comprises:
   a positive electrode;
   a negative electrode containing a negative electrode active material which has a lithium ion insertion potential of 0.4V (vs. Li/Li$^+$) or higher and a pore diameter distribution in which a median diameter is not smaller than 1 μm and a mode diameter is not larger than 1/10 of the median diameter, and the pore diameter distribution being measured by mercury porosimetry; and
   a nonaqueous electrolyte.

10. The battery pack according to claim 9, wherein a density of the negative electrode falls within a range of 1.5 g/cm$^3$ to 2.6 g/cm$^3$.

11. The battery pack according to claim 9, wherein the median diameter falls within a range of 1 to 3 μm.

12. The battery pack according to claim 9, wherein the negative electrode active material is formed of lithium-titanium oxide having an average particle diameter not larger than 0.7 μm.

13. The battery pack according to claim 12, wherein the lithium-titanium oxide has a spinel structure.

14. The battery pack according to claim 9, wherein the nonaqueous electrolyte contains at least two solvents selected from the group consisting of propylene carbonate, ethylene carbonate and γ-butyrolactone.

15. The battery pack according to claim 9, wherein a ratio of the mode diameter to the median diameter falls within a range of 0.01 to 0.1.

16. The battery pack according to claim 9, wherein a ratio of the mode diameter to the median diameter falls within a range of 0.017 to 0.05.

17. A vehicle, comprising the nonaqueous electrolyte battery defined in claim 1.

* * * * *